(12) United States Patent
Abburi et al.

(10) Patent No.: US 11,916,865 B1
(45) Date of Patent: Feb. 27, 2024

(54) METHODS AND SYSTEMS FOR ORGANIZING AND MANAGING ELECTRONIC MESSAGES

(71) Applicant: TagInbox Corporation, Bellevue, WA (US)

(72) Inventors: Rajasekhar Abburi, Tucson, AZ (US); Venkatakrishna Sharma Vedam, Naperville, IL (US); Brian K. Suchland, Seattle, WA (US)

(73) Assignee: TAGINBOX CORPORATION, Bellevue, WA (US)

( * ) Notice: Subject to any disclaimer, the term of this patent is extended or adjusted under 35 U.S.C. 154(b) by 0 days.

(21) Appl. No.: 18/185,699

(22) Filed: Mar. 17, 2023

Related U.S. Application Data

(60) Provisional application No. 63/320,932, filed on Mar. 17, 2022.

(51) Int. Cl.
  *H04L 51/42* (2022.01)
  *H04L 51/48* (2022.01)

(52) U.S. Cl.
  CPC .............. *H04L 51/42* (2022.05); *H04L 51/48* (2022.05)

(58) Field of Classification Search
  None
  See application file for complete search history.

(56) References Cited

U.S. PATENT DOCUMENTS

| | | | |
|---|---|---|---|
| 9,141,940 B2 | 9/2015 | Pocklington et al. | |
| 9,483,169 B2 | 11/2016 | Horn | |
| 11,057,327 B2 | 7/2021 | Madnani | |
| 2007/0208803 A1* | 9/2007 | Levi | H04L 51/214 709/203 |
| 2011/0289574 A1* | 11/2011 | Hull | G06Q 30/0601 726/7 |
| 2015/0278764 A1* | 10/2015 | Patil | G06F 16/93 705/301 |
| 2020/0104728 A1* | 4/2020 | Lakshmanan | G06Q 10/109 |

OTHER PUBLICATIONS

Sow et al., "SCOUT contextually organizes user tasks", Jan. 1, 2005, IEEE, IEEE International Conference on e-Business Engineering (ICEBE'05) (pp. 94-101) (Year: 2005).*

(Continued)

*Primary Examiner* — Davoud A Zand
(74) *Attorney, Agent, or Firm* — Kanika Radhakrishnan; Evergreen Valley Law Group

(57) ABSTRACT

The present invention relates to methods and systems for managing and organizing the emails. The method performed by an application server includes creating a shared mailbox including client accounts based at least receipt of user inputs through a client application from at least one user of an institution. The method includes monitoring mailboxes of the users in real-time for determining at least incoming emails from client users in the mailboxes. The method includes determining a client account based on parsing an incoming email received in the mailboxes of a user. The method further includes assigning the incoming email to a section in the client account based on a sharing option defined for the client account. The method includes transmitting a real-time notification to the user upon assigning the incoming email to the section, thereby indicating occurrence of an activity pertaining to the incoming email in the client account.

40 Claims, 18 Drawing Sheets

(56) References Cited

OTHER PUBLICATIONS

Tushaar Gangavarapu, Jaidhar C.D, Bhabesh Chanduka, Applicability of Machine Learning in Spam and Phishing Email Filtering: Review and Approaches, vol. 53, pp. 5019-5081, Feb. 22, 2020, Issue 8, India.

Park S., Zhang A., Murray L., Karger D., Opportunities for Automating Email Processing: A Need-Finding Study, Paper No. 374, pp. 1-12, Published: May 2, 2019, USA.

* cited by examiner

| | | | | 🔄 ABD.COM | | | ⊕ + 🔁 |
|---|---|---|---|---|---|---|---|
| ≡ | | | | MY ACCOUNTS | | ◯ | |
| | | | | | | ▦ ▦ | |
| | FLAGS | | ACCOUNTS (151) 602 | | SEARCH 🔍 | CATEGORY | SORT BY CATEGORY ∨ 604 |
| MY ACCOUNTS | | | ABBY | | | PROSPECT | |
| ⭐ RECENT ∨ | | | EMERSON AND EZEQUIEL | | | PROSPECT | |
| | | | GIA AND GRANT | | | PROSPECT | |
| 🏷 TAGS | | | LYRIC | | | PROSPECT | |
| | | | REAGAN AND ROLAND | | | PROSPECT | |
| ✓ TASK | | | SOPHIE | | | | |
| | | | ANTHONY AND ALESSANDRO | | | WTGFORSUB | |
| + CREATE ACCOUNT | | | EMMALYNN AND ERIK | | | WTGFORSUB | |
| | | | GIOVANNI | | | WTGFORSUB | |
| 📧 MY MAILBOX | | | KODA | | | WTGFORSUB | |
| | | | MARGO AND MILES | | | WTGFORSUB | |
| 👥 MY ORG ∨ | | | FINLEY | | | WTGFORRATEORSHOPPING | |
| | | | FRANCO AND FELICITY | | | WTGFORRATEORSHOPPING | |
| ≣ LISTS | | | JADE AND JOESPH | | | WTGFORRATEORSHOPPING | |
| | | | KADEN AND KAMILA | | | WTGFORRATEORSHOPPING | |
| ⓘ HELP ∨ | | | RILEY AND ROMAN | | | WTGFORRATEORSHOPPING | |
| | | | VERA, VALENTINO AND VINCENT | | | WTGFORRATEORSHOPPING | |
| | | | ANDI AND ALDO | | | FILENEEDSUPDATE | |
| | | | ARCHER AND AISHA | | | FILENEEDSUPDATE | |

METHODS AND SYSTEMS FOR ORGANIZING AND MANAGING ELECTRONIC MESSAGES

TECHNICAL FIELD

The present invention relates generally to the field of data processing, and more particularly relates to methods and systems for organizing electronic messages (i.e., emails) through a client application.

BACKGROUND

In recent times, electronic mail (i.e., email) is a popular tool used as a communication medium in various sectors (e.g., business communications). Email communication is used for many purposes such as sharing information, documents, and photos, establishing legally binding contracts, discussions, and coordinating activities between individuals, and groups. Further, email communications provide interoperability, even when the sender and receiver(s) are distributed around the globe, speaking various languages. Over time, many email communications have exponentially increased thus leading an individual to receive a large number of emails (collectively including non-spam, spam, junk, etc.) on a daily basis. However, the user's fundamental approach to emails remains the same over the decades. Thus, the individual may find it cumbersome and time-consuming to go through all the emails received each day. Thus, it is difficult for the individual to identify, focus, and analyze priority emails when there is an extremely large volume of emails.

Over the years, email communications have evolved significantly and are capable of now sharing and/or receiving full multimedia messages with text, images videos, hyperlinks formatted text and so on. However, the use of address books to manage contacts, email recipients, and senders has become sophisticated. The use of emails has also spread from mailboxes on computing devices (e.g., computers or Smartphones) to mailboxes in the cloud. Further, cheap, massive storage on computing devices from which the emails are accessed and the cloud has led users to accumulate their email messages. In other words, most emails are stored by default in a single electronic mailbox or folder until the recipient of the email processes them individually. This has caused email inboxes to grow to colossal sizes also referred to as email overload. The typical high volume of emails usually requires a significant expenditure of resources managing the emails as mentioned above.

In order to address the above-mentioned problems, many techniques are developed. One such technique is Email folders defined with rules to organize the emails in respective folders. However, the rules defined in the conventional technique require the individual to organize the emails which is again a time-consuming process, and also the individual can easily email if the user doesn't remember to check the folder for new emails Further, the conventional techniques facilitate filtering messages to remove junk mail by deleting the mail before it goes into the user's mailbox. However, such attempts often are limited in their granularity (e.g., not well adjusted to addressing individual conversations, etc.) when attempting to determine if mail is junk and their scope is also typically limited in regards to dealing with long term filtering of messages.

In case of business organizations, the conventional technique fails to handle the high volume of emails. As result, the productivity of email users can be hampered at several events such as when a great quantity of emails is received, when interrupted by new emails, when copied on email threads that are not being followed and when figuring out which emails to focus on, how to return to emails that were being worked on previously, how to choose the correct email addresses for recipients, how to send bulk emails and so on. Meanwhile, when coworkers of the organization are involved, it becomes even more difficult to perform the aforementioned actions.

Therefore, there is a need for methods and systems to handle email overload, interruptions, coordination and organizing the emails in an efficient way, in addition to providing other technical advantages.

SUMMARY

Various embodiments of the present disclosure disclose methods and systems for organizing and managing emails through a client application.

In an embodiment, a computer-implemented method is disclosed. The computer-implemented method performed by an application server includes creating a shared mailbox including a plurality of client accounts based at least receipt of user inputs related to a plurality of client users through a client application from at least one user associated with an institution. The shared mailbox corresponds to a common mailbox of the institution and configured to store and retrieve emails across the institution. The method includes monitoring one or more mailboxes of the at least one user in real-time for determining at least incoming emails from the plurality of client users in the one or more mailboxes. Further, the method includes determining a client account among the plurality of client accounts based at least on parsing an incoming email received in the one or more mailboxes of the at least one user. The incoming email is parsed based at least on one or more attributes. The one or more attributes includes at least a sender's email address, a recipient email address, content identifiers and a unique message identifier (ID). The method further includes upon determining the client account, assigning the incoming email associated with the client account to a section among a plurality of sections in the client application. The incoming email is assigned to the section for the client account in the client application based at least on a sharing option defined for the client account. The method includes transmitting a real-time notification to the at least one user in the client application upon assigning the incoming email to the section of the client account, thereby indicating an occurrence of an activity pertaining to the incoming email in the client account to the at least one user of the client application. The method includes creating, by the application server, annotations to the emails in the shared mailbox with action items notes, tasks and deadlines for the at least one user, thereby navigating the at least one user to the emails in the shared mailbox based on the annotations assigned to the emails.

In another embodiment, an application server is disclosed. The application server includes a memory configured to store instructions and a processor. The processor is configured to execute the instructions stored in the memory and thereby cause the application server to at least create a shared mailbox including a plurality of client accounts based at least receipt of user inputs related to a plurality of client users through a client application from at least one user associated with an institution. The shared mailbox corresponds to a common mailbox of the institution and configured to store and retrieve emails across the institution. The application server is caused to monitor one or more mailboxes of the at least one user in real-time for determining at least incoming emails from the plurality of client users in the one or more mailboxes. Further, the application server is caused to determine a client account among the plurality of client accounts based at least on parsing an incoming email received in the one or more mailboxes of the at least one user. The incoming email is parsed based at least on one or more attributes. The one or more attributes includes at least a sender's email address, a recipient email address, content identifiers and a unique message identifier (ID). The application server is further caused to assign the incoming email associated with the client account to a section among a plurality of sections in the client application. The incoming email is assigned to the section for the client account in the client application based at least on a sharing option defined for the client account. The application server is caused to transmit a real-time notification to the at least one user in the client application upon assigning the incoming email to the section of the client account, thereby indicating occurrence of an activity pertaining to the incoming email in the client account to the at least one user of the client application. The application server is further caused to create annotations to the emails in the shared mailbox with action items notes, tasks and deadlines for the at least one user, thereby navigating the at least one user to the emails in the shared mailbox based on the annotations assigned to the emails.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers:

FIG. 6A illustrates an example representation of a user interface (UI) depicting a list of client accounts sorted based on categories in the client application, in accordance with an embodiment of the present disclosure;

FIG. 7D illustrates an example representation of a user interface (UI) depicting a chat tab in the client application, in accordance with an embodiment of the present disclosure;

Figure 1:
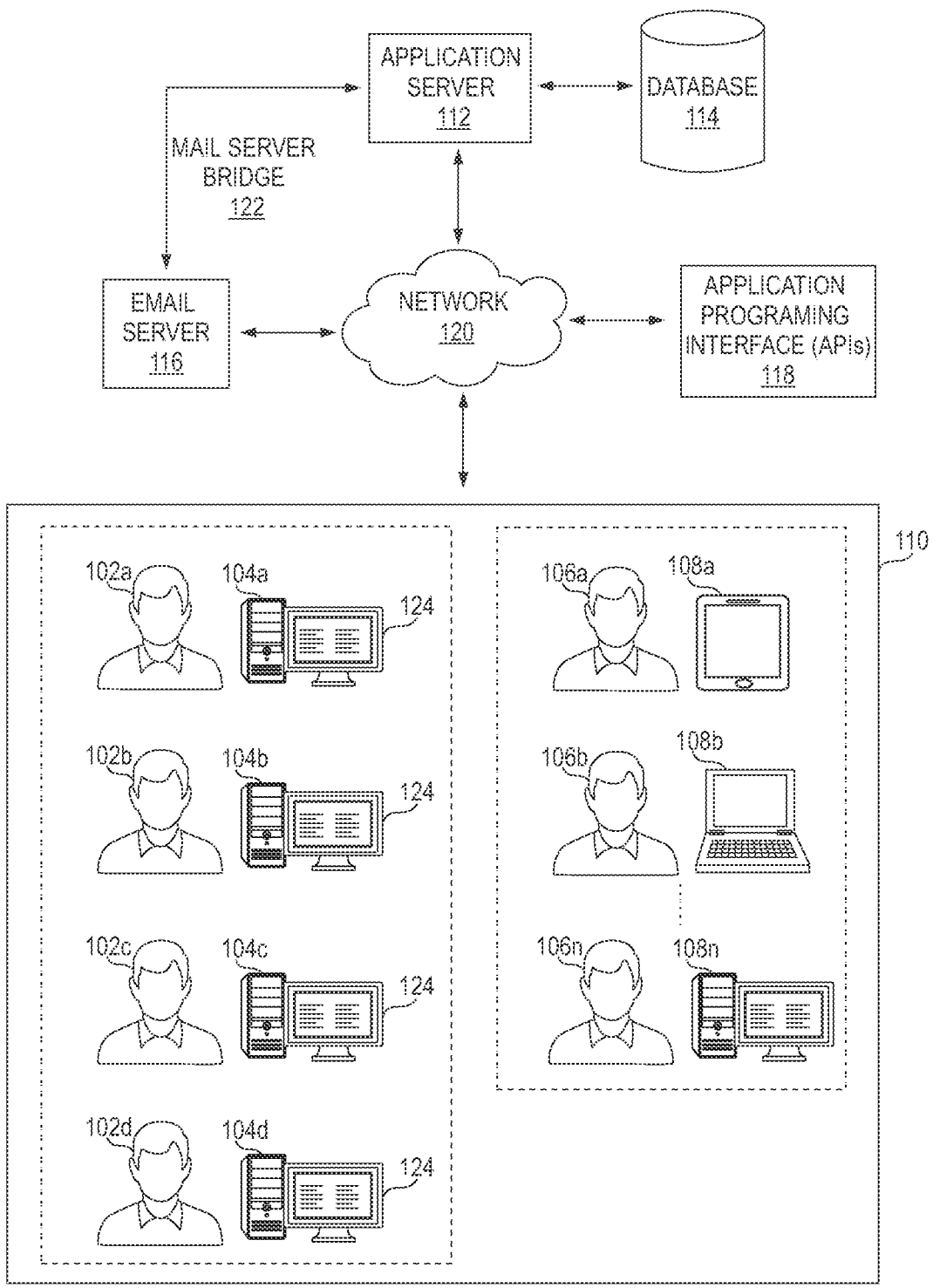
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or conjunction with each other, one skilled in the art will appreciate that many of these features can be provided independently of other features.

Various embodiments of the present disclosure discloses an application server and method for organizing and managing emails across an institution. The application server collates such client emails from a plurality of users and organizes them by copying them into respective folders for each client. Such folders embody a conceptual "client account". Each "client account" thus is a consolidation of all emails from clients assigned to the client room by the users assigned to the client room. This application server can also symmetrically organize such emails (copied to client accounts) into similar folders in each of the recipients of such emails in the organization, if assigned to that client account. Essentially, a copy of an email to a user to the client account in the application server, can also trigger local copies of that email in each of the user's respective email inboxes. The application server also serves as a repository of the annotations for emails in client accounts and related task management, chat discussions in the client accounts. In essence e, this method transforms individual email into collective email organized into client accounts becoming the center of navigation and processing of emails, with action items driving which accounts are visited and which emails are handled. We refer to this as "serial monotasking", the opposite of multitasking. To further clarify, in "multitasking" users switch to scan new emails as they arrive, interrupting their current work and expending the context switching cost, the time it takes for human brain go pause current thinking and start thinking about something else, which can range from a few seconds to several minutes. In "serial monotasking" users are shielded from interruptions from other client accounts, provided with full context and can complete tasks quickly without interruptions.

Various embodiments of the present invention are described hereinafter with reference to FIG. 1 to FIG. 11.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 is configured to perform one or more operations such as organizing and managing electronic messages (i.e., emails) in an efficient way. As shown, the environment 100 includes at least one user. The at least one user includes a user 102a, a user 102b and a user 102c. Each of the users 102a, 102b and 102c is associated with a user device 104a, a user device 104b and a user device 104c, respectively. The environment 100 further includes a plurality of client users such as a client user 106a, a client user 106b . . . a client user 106n. Further, each of the client users 106a, 106b . . . 106n is associated with a computing device 108a a computing device 108b . . . a computing device 108n), respectively. The environment 100 further includes a user 102d associated with a user device 104d. In an embodiment, the user devices 104a-104d and the computing devices 108a, 108b . . . 108n may include, but not limited to, to a personal computer (PC), a mobile phone, a tablet device, a personal digital assistant (PDA), a smart phone, a laptop and pagers.

For description purposes, the users 102a-102c may be referred to as staff members or employees of an organization (see, 110), and the client users 106a and 106b may represent a group of people outside the organization who receive services from the workgroup within the organization 110. The user 102d may be a supervisor in the institution 110. The organization 110 is hereinafter interchangeably referred to as the institution 110. The institution 110 includes employees and administrators as explained above. The users 102a-102c (or the staff members) in the organization 110 who uses a client application 124 to manage their emails. Each of the users 102a-102c (staff members) may be associated with at least one client user among the plurality of client users of the institution 110. The client application 124 equipped in the respective user devices 104a-104c of the users 102a-102c organizes and manages emails from the client users 106a, 106b . . . 106n in an efficient way which will be explained further in detail.

The environment 100 further includes an application server 112, a database 114 associated with the application server 112, an email server 116 and one or more application programming interfaces (APIs) 118. Each of the entities of FIG. 1 is communicably coupled to each other via a network 120. The network 120 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 120 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 120 may include multiple different networks, such as a private network made accessible by the application server 112, separately, and a public network (e.g., the Internet, etc.).

In one embodiment, the application server 112 is configured to perform one or more of the operations described herein. The application server 112 is coupled to the institution 110 through the network 120. Further, the email server 116 is communicably coupled to the application server 112. In an embodiment, the application server 112 may be coupled to the email server 116 through a mail server bridge 122. The mail server bridge 122 may include any wireless communication protocols. In some embodiments, the application server 112 may be communicably coupled to the email server 116 via the network 120. The email server 116 may include one or more servers configured to manage one or more mailboxes associated with each of the users 102a-102c of the institution 110. In particular, the email server 116 manages incoming and outgoing mails of the one or more mailboxes associated with each of the users 102a-102c in the institution 110.

Further, the application server 112 may be configured to host and manage the client application 124. The client application 124 may include one or more components that may be stored in the database 114 associated with the applications server 112. The client application 124 may be implemented with both server and client software combined into a standalone application. It is to be noted that client application 124 can be implemented with the existing computer programming language (e.g., Python or Java, and JavaScript or HTML) running on the server side and client side, respectively, on any operating systems (e.g., Windows or Unix) on the user devices 104a-104c and on the client side), or other combinations. The user devices 104a-104c may be equipped with an instance of the client application 124. The client application 124 is a set of computer-executable codes configured organize and manage the emails across the one or more mailboxes of each of the users 1021-102c in the institution. In an embodiment, the application server 112 may render the instance of the client application 124, in response to the receipt of a request from the user devices 104a-104c via the network 120. In some embodiments, the client application 124 may be accessed through the website over the network 120 using web browser applications installed in the user device (e.g., the user devices 104a-104c). For description purposes, the client application 124 is explained with reference to managing the emails of the staff members in the organization 110. Alternatively, the client application 124 can be used by any individual or a group of users, or a community etc., for organizing the emails, therefore it should not be taken to limit the scope of the present disclosure.

The application server 112 creates a shared mailbox in the client application 124. The shared mailbox includes a plurality of client accounts for the client users 106a, 106b . . . 106n of the institution 110, thereby providing a shared common view to the users 102a-102c. The application server 112 may create the client account based on receiving user inputs related to the client users 106a, 106b . . . 106n from at least one user (e.g., the user 102a) in the client application 124. For example, the client users 106a and 106b may be assigned to the user 102a who is the coordinating staff for the client users 106a and 106b. In this scenario, the user 102a may provide the inputs related to the client users 106a and 106b in the client application 124. The user inputs may be email addresses of the client users 106a and 106b. Further, the user 102a may have to report the communication/status of the client users 106a and 106b to the user 102b, who may be the senior staff member of the institution 110. As such, the applications server 112 creates a client account for managing the emails from the client users 106a and 106b based on the user inputs. Further, the list of staff members who have access to the client account can be modified in the client application 124 after the client account has been created.

Further, each client account may include emails, tasks, chat, tags and/or a particular project or topic, that can be shared with permissions with zero or more staff members (i.e., the users 102a-102c) in a workgroup as explained above. In other words, the clients account typically represents a group of people (e.g., the client users 106 and 106b) outside the institution 110 who receive a service from the institution 110. Some examples of the client account may represent a loan application, a tax filing or the like, which could be for a single person or a married couple or the like. The client user/client person/client contact are various people that belong to the client account. For instance, Victor and Maya could be husband and wife that are part of a client account. Victor could have one email address and Maya could have four email addresses that she uses for communication on this account. Further, the client user may not have access to the system (i.e., the client application 124) and may only be a person that communicates with the staff (e.g., the users 102a and 102b) of the organization 110, and whose emails could end up in the client account.

The application server 112 monitors the mailboxes of the users 102a-102c in real-time and organizes the emails in the client application 124. In particular, the application server 112 performs real-time monitoring of the mailboxes associated with the users 102a-102c through the APIs 118. In an embodiment, the application server 112 may use the APIs 118 such as, but not limited to Office 365 APIs. Alternatively, the applications server 112 may communicate with at least an incoming mail server (IMAP) and a Simple Mail Transfer Protocol (SMTP). The APIs 118 are used to create folders, monitor for emails, get email headers, get email bodies, copy emails, add emails to folders, and to move emails to folders which will be explained further in detail. The applications server 112 utilizes the APIs 118 to determine email related activities (e.g., incoming emails, sending out emails, etc.) in the mailboxes of the users 102a-102c in the institution 110. Thereafter, the application server 112 actively copies and manages emails and associated data of all the users 102a-102c in the organization 110 into the shared mailbox, thereby providing common context to all the users 102a-102c who have/may have access to the client application 124.

The application server 112 allocates the emails in specific folders in the shared mailbox and retrieves them. Upon clicking the client account, the user (e.g., the user 102a) may be provided with UI in the user device 104a that depicts a series of tabs (e.g., shared emails, unshared emails, tasks, tags, etc.) for accessing the emails from the client users (e.g., the client users 106a and 106b) which will be explained further in detail. The application server 112 processes the emails received in the mailboxes of the user 102a to determine the client account for the emails received or sent from the mailboxes. Thereafter, the emails are sorted in the client application 124 which can be viewed by providing inputs in the corresponding tabs as mentioned above.

Further, the application server 112 is configured to transmit real-time notifications to the users of the client account upon assigning the emails. It is to be noted that the shared mailbox does not directly receive emails from external users or send them to external users (e.g., the client users 106a, 106b . . . 106n). In other words, the shared mailbox corresponds to a common mailbox of the institution 110 and is configured to store and retrieve emails across the institution 110. The common mailbox is hidden and is access only by the applications server 112 for copying and retrieving all the emails across the institution 110. In addition, the application server 112 enables the users 102a-102c to perform email-related actions, provide chat feature, add notes, sending bulk emails, and the like in the client application 124 which will be explained further in detail.

The application server 112 may send fragments of the database 114 to the clients where it is merged into the client database with custom post-merge actions. In an embodiment, the database 114 can be configured in the cloud with all the records relating to a user's email, client accounts, the client users, shared emails, and the like. In some embodiments, it may or may not be feasible to replicate all the records to all the devices (e.g., the user devices 104a-104c) of a user (e.g., the users 102a-102c) to access the services of the client application 124. Further, providing access to the client application 124 for the users 102a-102c depends option user selection of their usage preferences which will be explained further in detail. The records in the database 114 are accessed in the client application 124 as needed, on demand. In essence, the local database on the user devices 104a-104c can be a fraction of the database 114 in the cloud but has the skeletal structure. Further, due to synchronized workflow, notifications are transmitted to the users in real-time, with post local database-merge actions to give the illusion of having all the data locally.

The number and arrangement of systems, devices, and/or networks shown in FIG. 1 are provided as an example. There may be other systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices.

Figure 2:
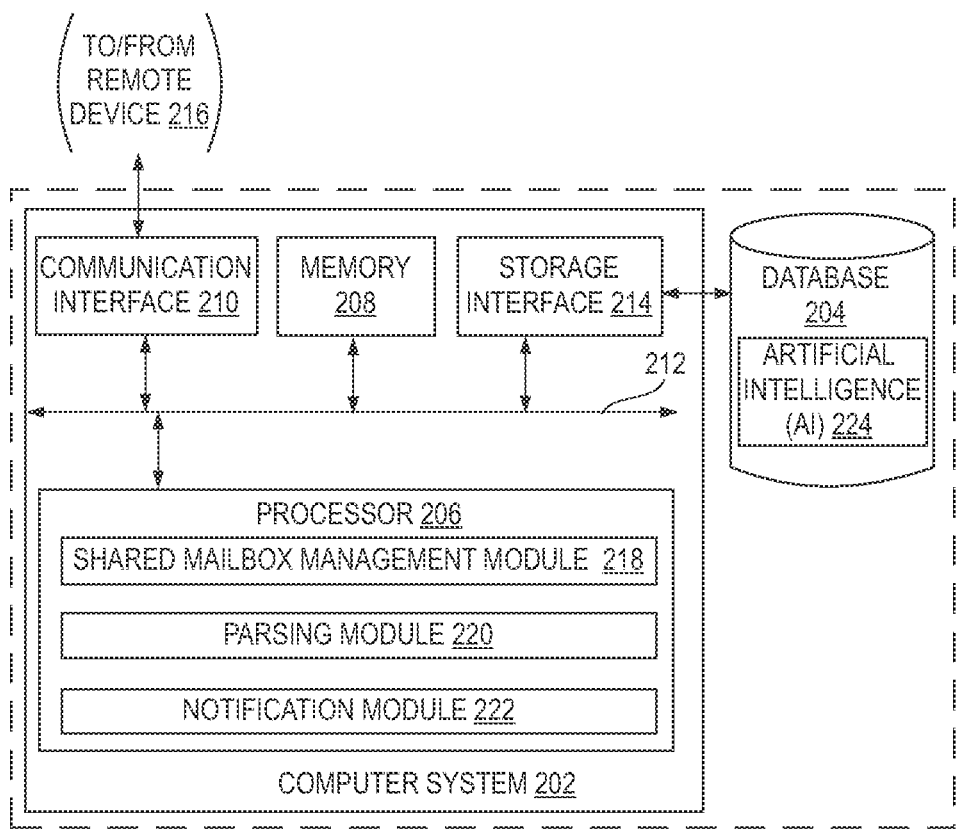
FIG. 2 illustrates a simplified block diagram of an application server used for organizing emails of the institution in a client application, in accordance with an embodiment of the present disclosure.

FIG. 2 illustrates a simplified block diagram of an application server 200 used for organizing emails of the institution in the client application 124, in accordance with an embodiment of the present disclosure. Examples of the application server 200 include, but are not limited to, the application server 112 as shown in FIG. 1. The application server 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the client application 124 and one or more components of the client application 124. The one or more components of the client application 124 may include the shared mailbox. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the application server 200, as described herein. In some embodiments, the memory 208 may be realized in the form of a database server or cloud storage working in conjunction with the application server 200, without deviating from the scope of the present disclosure.

The processor 206 is operatively coupled to the communication interface 210 such that the processor 206 is capable of communicating with a remote device 216 such as the user devices 104a-104c, the computing devices 108a, 108b . . . 108n, the email server 116, the APIs 118, or with any entity connected to the network 120 as shown in FIG. 1.

It is noted that the application server 200 as illustrated and hereinafter described is merely illustrative of an apparatus that could benefit from embodiments of the present disclosure and, therefore, should not be taken to limit the scope of the present disclosure. It is noted that the application server 200 may include fewer or more components than those depicted in FIG. 2.

In one embodiment, the processor 206 includes a shared mailbox management module 218, a parsing module 220, and a notification module 222. As such, the one or more components of the processor 206 as described above are communicably coupled with the client application 124.

The shared mailbox management module 218 includes a suitable logic and/or interfaces for managing the client accounts in the client application 124. The module 218 may be configured to create the shared mailbox for the institution 110 for managing the emails of each staff member (or the users 102a-102c) of the institution 110. Prior to using the client application 124 for managing the emails across the mailboxes of the users 102a-102c, the organization 110 is required to undergo a one-time registration process (or sign up). Upon completing the one-time registration process an administrator (e.g., the user 102c) may setup the client application 124 as their email access and management interface, thereby allowing the client application 124 to access the mailboxes of the users 102a-102c and create the shared mailbox with an organizational email account.

Furthermore, each staff member (e.g., the users 102a-102c) of the organization 110 are also requested for signing up and setting up their individual access to their email through the client application 124. During this one-time setup, the user 102a-102c may provide their login ID and password details to their organizational email account. This may enable the authorization process to authorize the client application 124 to access their email through authentication and authorization tokens. Thus, each user 102a-102c may use their respective login ID and password details in the client application 124 for accessing their emails via the client application 124.

As explained above, the shared mailbox includes the plurality of client accounts. The client accounts are created in the client application 124 upon receipt of user inputs (e.g., email address) related to the client users 106a, 106b . . . 106c by the users 102a-102c. The shared mailbox provides a shared common view to all the users 102a-102c associated with the corresponding client accounts. Each staff member (i.e., the users 102a-102c) of the organization 110 is associated with respective mailbox managed by the email server 116 through the network 120. For instance, the user 102a may be associated with a mailbox A, the user 102b may be associated with a mailbox B, and the user 102c may be associated with a mailbox C. Further, the users 102a-102c are provided access to the shared mailbox through the application server 200.

Typically, the shared mailbox virtually collates the emails across the organization 110 to provide common context to all users who have/may have access. In other words, the module 218 is configured to centralize all client emails across all mailboxes of the users 102a-102c, and then to cluster them by clients into their corresponding client account. Further, access to the shared mailbox can be governed with permissions defined by the administrators or usage preferences selected by the users 102a-102c while registering in the client application 124.

Figure 3A:
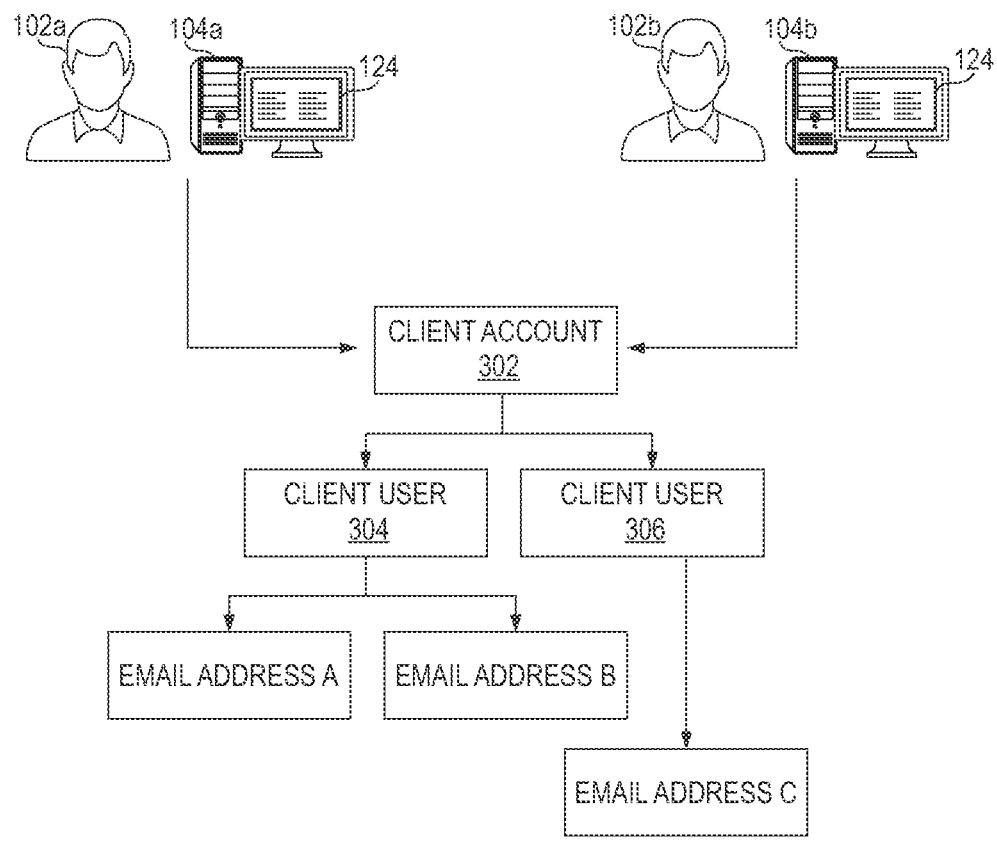
FIG. 3A is an example representation of a client account in the client application including users, client users and their contact information, in accordance with an embodiment of the present disclosure.

Referring to FIG. 3A, a client account 302 can be accessed by two staff members such as the users 102*a* and 102*b*. Further, client account 302 includes a client user 304 and a client user 306. It is to be noted that the client account 302 and the client users 304 and 306 may be part of the plurality of client accounts as explained with reference to FIG. 1. For example, the client users 304 and 306 may be the client users 106*a* and 106*b*, respectively. The client user 304 has access to two emails address (exemplarily depicted as "Email Address A" and "Email Address B") and the client user 306 has access to one email (exemplarily depicted as "Email Address C"). Thus, any emails from the aforementioned email address will be assigned to the client account 302, thereby allowing a shared common view to all the users of the client account 302. In other words, the client account 302 (may be referred to as "client room") is a collection of relevant and related emails to or from a set of people (or the client users 304 and 306), each of whom may have multiple email addresses and emails that fit some criteria. The emails of the client account 302 may be of a loan application, or a project.

Referring to FIG. 2, the shared mailbox management module 218 is configured to monitor the mailboxes of the users 102*a*-102*c* in real-time. In particular, once the staff member (or the users 102*a*-102*c*) of the organization 110 has completed creating their account and linking it to their email account, the module 218 begins monitoring their email account. As explained above, the module 218 utilizes the APIs 118 for real-time monitoring of the mailboxes (or the email account) of the users 102*a*-102*c* across the organization 110. This involves connecting to the account (or syncing with mailboxes) of the users 102*a*-102*c* for determining email related activities (e.g., incoming emails, sending emails, etc.).

In one scenario, the shared mailbox management module 218 monitors the one or more mailboxes of the at least one user (i.e., the users 102*a*-102*c*) in real-time for determining at least incoming emails in the mailboxes. The incoming emails may be from the client users 106*a* and 106*b* (or the client users 304 and 306). Upon receipt of the new email or identifying the incoming email in the mailboxes of the users (e.g., the users 102*a* and 102*b*), the module 218 actively copies and manages emails and associated data of the users 102*a* and 102*b* in the organization 110 into the shared mailbox. Thereafter, the shared mailbox management module 218 determines a client account among the plurality of client accounts which is explained further in detail.

The parsing module 220 includes a suitable logic and/or interfaces for parsing an incoming email received in the mailboxes of the users 102*a* and 102*b* based at least on one or more attributes. The attributes includes at least a sender's email address, a recipient email address, content identifiers and a unique message identifier (ID). The parsing module 220 may initially determine if at least one of the sender's email address and the recipient email address in the incoming email matches with at least one client user. In one case, the client account of the incoming email is determined if the sender's email address, or any of the recipients of that email, matches the client user. The client account for the incoming email may be marked as a home room.

In addition, the parsing module 220 may access the incoming email to determine content identifiers. The content identifiers may include a set trigger words or phrases. The parsing module 220 checks for the content identifiers in at least the sender's email address or subject line or body of email in the incoming email. For example, a client account may be associated with a trigger word "forest". The incoming email may include the subject line of "Help Save Our Forests". In this scenario, the parsing module 220 in conjunction with the module 218 determines the client account associated with the trigger words "forest" for the incoming coming including the subject line "Help Save Our Forests". In an embodiment, the client account can be associated with multiple trigger words to cluster all relevant incoming or outgoing emails.

Further, the parsing module 220 is configured to identify the unique message ID associated with the incoming email. Thereafter, the shared mailbox management module 218 determines the client account for the incoming email based on the unique message identifier (ID) associated with the incoming email. The unique message ID for the email is created that identifies it as originating from the service and from a specific client account. The unique message ID identifies the client account and can be used to target the replies (i.e., the incoming email) to that the corresponding client account, irrespective of who sent it or if other clients were copied on it or not. As such, when the users 102*a* and 102*b* receive an incoming email which is a reply to an earlier email, the unique message ID may be appended in the incoming email as the in-reply-to header in the incoming email. Thus, the module 218 parses the unique message ID to identify it as a reply to a shared email for the particular client account.

Upon identifying the client account for the incoming email, the incoming email is assigned to the client account in the client application 124 for the staff members (or the users 102*a* and 102*b*) to view. This implies that all the replies (or the incoming emails) to an original email sent out that is associated with the client account will be included in the client account as the email conversation progresses between the users 102*a*-102*c* and the client users 106*a* and 106*b* which will be explained further in detail.

Further, the shared mailbox management module 218 determines a section among a plurality of sections for the incoming email associated with the client account. The module 218 assigns the incoming email to the section associated with the client account in the client application 124 based on a sharing option defined for assigning the incoming email. The sharing option may include at least an auto-share option and a manual share option. In an embodiment, the sharing option may be selected by the users 102*a*-102*c* using the client application 124. The plurality of sections for the emails may be defined as an unshared email section and a shared email section.

In one scenario, the module 218 determines the section for the incoming email associated with the client account as the shared email section in case of user selection of the auto-share option in the client application 124. This implies that when an email (i.e., the incoming email) is automatically assigned to the client account based on determining the sender or recipient being the client user or the user (i.e., staff member) of the client account, or determining the unique message ID or the content identifiers of the incoming email. The shared email section provides a window to all the shared emails for that particular client account. The shared email section includes the emails that were received by the user (e.g., the user 102*a*) from the client user (e.g., the client user 106*a*) that were automatically moved to the client account.

In another scenario, the module 218 determines the section for the incoming email associated with the client account as the unshared email section in case of user selection of the manual share option in the client application 124. As explained above, the module 218 actively copies all the emails of the mailboxes of the users 102*a*-102*c* in the shared mailbox associated with the client application 124. In an example scenario, the incoming email in the mailbox of the user 102a is copied to the shared mailbox. The incoming email may be further assigned to the unshared email section for the user 102a in the client application 124, if the user 102a has opted for the manual share option. In another example scenario, some emails are targeted for multiple client accounts among the plurality of client accounts. In this scenario, the module 218 assigns the emails to the corresponding section (e.g., the shared email section) associated with the emails based on receiving inputs from the user 102a.

In another scenario, the module 218 is further configured to identify the incoming email is one of a personal email and a private email received in the mailboxes associated with a user among the at least one user 102a-102c. In this scenario, the module 218 prevents the email (i.e., the personal and private emails) from being copied to the shared mailbox although the user 102a has opted at the auto-share option or the manual share option. In other words, the module 218 allows for manual-override to rule out certain personal or private emails from being copied for common access.

Figure 3B:
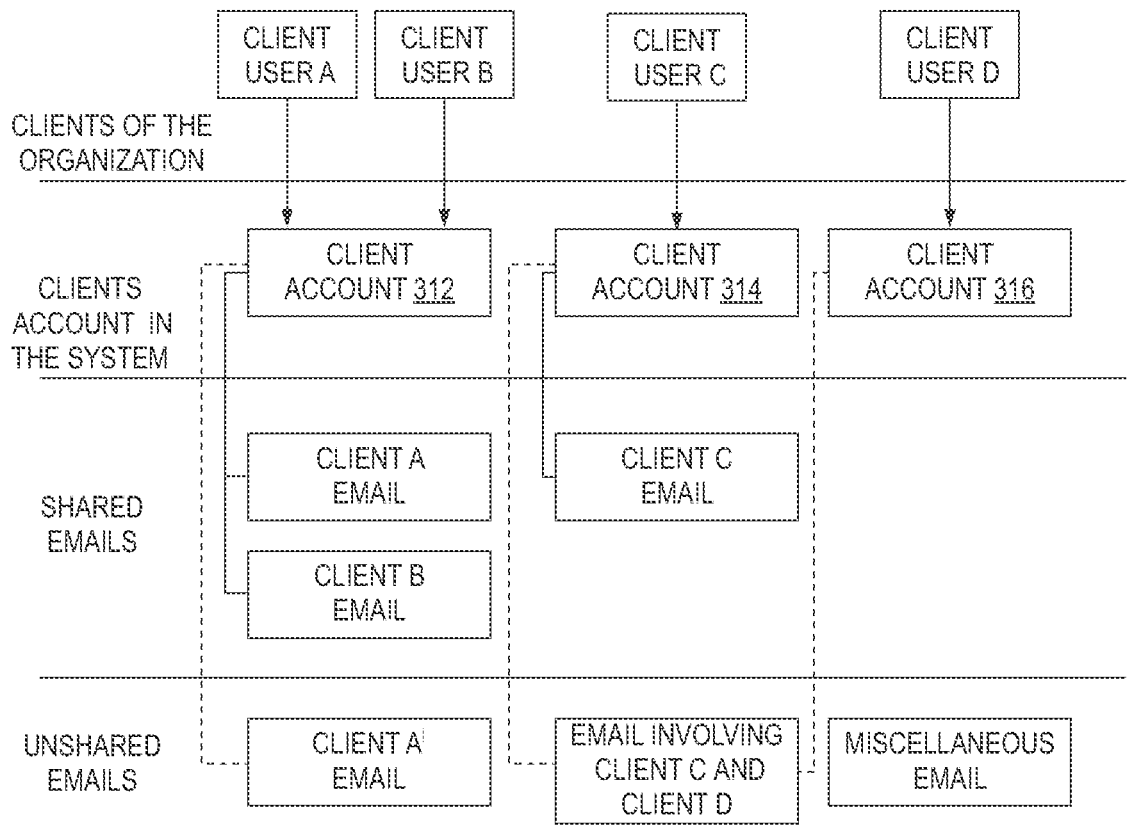
FIG. 3B is an example representation of organizing emails in a shared mailbox, in accordance with an embodiment of the present disclosure.

Referring to FIG. 3B, an example representation of organizing emails in the shared mailbox is shown, in accordance with an embodiment of the present disclosure. As shown, the client users are exemplarily represented as a client user 'A', a client user 'B', a client user 'C' and a client user 'D'. It is to be noted that the client users A and B are associated with a client account 312, the client user C is associated with a client account 314 and the client user D is associated with a client account 316. Further, the client account 312 includes a client A email and a client B email in the shared email section. The client A email and the client B email represent emails from the client user A and the client user B. This implies that the emails from the client users A and B are automatically routed to the shared email section of the client account 312 created for the client users A and B. As explained above, the module 218 automatically routes the emails from the client users A and B to the shared email section of the client account 312 based on selection of the auto-share option by the client users A and B. Similarly, the module 218 applies the email from the client user C (represented a client C email) to the shared email section of the client account 314.

Further, an email (represented as client A' email) from the client user A and an email involving client user C and client user D are assigned to the unshared email section of the client accounts 312, 314 and 316. For instance, the module 218 may determine that the client A' email may require user inputs for performing necessary actions to the client A' email. In this scenario, the user (or staff) may provide inputs in the client application 124 for moving the client A email from the unshared email section to the shared email section in the client account 312.

Similarly, the email involving the client users C and D may be automatically assigned to both the client accounts 314 and 316 by the application server 200. In particular, the application server 200 checks sender's email address and recipient's email address on a given email, from/to/cc/bcc to identify if any of them are associated with the client users, and further determines the client accounts as a possible destination as explained above. So if different clients (such as the client users C and D) are present in a common email, multiple destinations (such as the client accounts 314 and 316) are set for that email. Alternatively, the email involving the client users C and D may be assigned to both the client accounts 314 and 316 by the application server 200 upon receipt of inputs from any one of the user assigned to the client accounts 314 and 316. Also, in the example above, if the client user C replies-all to the email involving client users C and D, then that reply follows the same path, being a candidate for multiple client accounts.

In one example, if the above email involving the client users C and D may be included with a third person (not shown in figures) with an email address "common_friend@yahoo.com". In this example scenario, if the third person replies-all to the email involving the client users C and D. The module 218 assigns the reply email from the third person to both the client accounts 314 and 316 as the third person now becomes a candidate for both client users C and D. The module 218 assigns the reply email to both client accounts 314 and 316 based on the unique message ID (and in-reply-to ID) associated with the reply email as explained above.

In addition, the module 218 may be configured to determine miscellaneous emails (e.g., junk emails) and assigns the miscellaneous emails to the unshared email section. As shown in FIG. 3B, the unshared email section of the client account 316 include miscellaneous emails.

Referring to FIG. 2 in conjunction with FIG. 3B, the module 218 is configured to monitor for email related actions being performed by the at least one user (e.g., the user 102a) in the client account (e.g., the client account 312) for organizing emails associated with the client account 312. In this scenario, the email related actions include at sharing emails from the unshared email section to the shared email section. Further, the email related actions also include at least moving emails, processing inbound emails and the like. In another scenario, the email of the client account 312 can also be moved back from the shared email section to the unshared email section. In another scenario, the user 102a may move the shared email associated with the client account 312 to another client account (e.g., the client account 314) either due to it being mistakenly shared, or a reorganization of the client accounts). To that effect, the module 218 is configured to facilitate background processing of the email related actions being performed by the user 102a as described in the above example scenarios, thereby improving the overall performance.

Additionally, the application server 200 is configured to determine a follow up action associated with a user of the at least one user for at least the incoming email for the client account (e.g., the client account 302). The follow up action is determined based at least on a centralized email tagging of the incoming email created by another user of the at least one user of the client account 302 for the user of the client account. As shown, the at least one user of the client account 302 are the users 102a and 102b. In this scenario, the incoming email in the client account 302 may be related to the user 102a. The user 102a may complete the task and create a centralized tag for the incoming email. The centralized tag created by the user 102a in this instance may include the follow up action to be performed by the user 102b. In another example scenario, the client account 302 may also be assigned with the user 102c. In this scenario, the user 102a may be the first person to view the incoming email and creates the follow up action that the incoming email is related to the user 102c by the centralized email tagging. This corresponds to team-sourcing i.e., saves time from everyone else from having to review the incoming email.

Further, the shared mailbox management module 218 is configured to monitor a client account (e.g., the client account 302) to determine an activity related to sending an email from the client account by the at least one user (e.g., the users 102a and 102b) of the institution 110. Further, sending the email from the client account corresponds to at least one of replying to the incoming email, and sending a new email. It is to be noted that when the user 102a sends an email to the client user 304 and/or the client user 306 from that client account 302, the email is sent out from the email account of the user 102a. Further, a copy of the sent email is stored in a dedicated, service-specific sent folder in the email account of the user 102a. Since the email is being sent out as a shared email from the client account 302, another copy is created in a subfolder of the client account 302 in the shared mailbox account of the institution 110 (where it can be accessed when required). As explained above, the unique message ID is created for the email that identifies it as originating from the service and a specific client account.

Further, the module 218 selects at least one client user (such as the client users 304 and 306) associated with the client account 302 as default recipients of the client account 302 in response to determining the activity related to sending the email from the client account 302. Specifically, when the user 102a sends the email from the client account 302, the default recipients are each client user set for the client account 302. The users 102a and 102b of the client account 302 are not included as default recipients when the email is sent in the client account 302 by any one of the user 102a or 102b of the client account 302. This reduces interruptions for other staff in the room.

Thereafter, the module 218 provides access to the email sent to the default recipients (such as the client users 304 and 306) from the client account 302 to each user (i.e., the users 102a and 102b) assigned to the client account 302. Thus, if a user (i.e., the user 102b) is not included on a shared email thread for the client account 302, both the users 102a and 102b will still have access to the shared email conversations that are stored in the client account 302. Hence, it is not necessary to add each user as a carbon copy (cc) on every email to provide access.

In one scenario, the module 218 is configured to identify the identify a contact information of one user among the at least one user in the incoming email and the outgoing email of the client account 302. Thereafter, the module 218 assigns the incoming email or the outgoing email to the client account 302 based at least on identifying the contact information of the one user among the at least one user of the client account 302. For example, the client user 304 may send an email to only the user 102a of the client account 302. In this case, the module 218 assigns the email from the client user 304 to the client account 302 based on the contact information of the user 102a of the client account 302. This corresponds to centralizing the emails in the client account 302. Further, centralizing the emails (i.e., the incoming and outgoing emails) in the client account 302 eliminates duplication by providing access to other users (such as the user 102b) who are not copied in at least one of the incoming email and the outgoing email associated with the client account 302. Moreover, assigning the incoming and outgoing emails in the corresponding client account conforms to serial monotasking i.e., minimizes context switching cost. Further, user related tasks are grouped for enabling the at least one user to handle the user related tasks in sequence, and wherein the user related tasks and activities associated with the at least one user are clustered for enabling the at least one user to check at least new emails, tasks, tags, chat messages in the client application. In particular, the user related tasks are grouped and handled in sequence as opposed to jumping back and forth between related or unrelated tasks (multitasking). The method clusters activities that require a user's attention (such as new emails, tasks, tags, chat messages), by client rooms and flags at the room level, instead of the detailed activity level, so user can choose which room to work on, and upon entering, find details of all the related items that require the user's attention, complete the work, and then find the next client account that requires the user's attention.

It is to be noted that the incoming email and the outgoing email associated with each client account of the plurality of client accounts are copied to the shared mailbox and further assigned to their corresponding client account. Further, the users 102a and 102b are allowed to perform one or more email operations in the client account 302 for managing and organizing the emails in the client application 124. The email operations include a combination of at least standard email operations and specific email operations. The standard email operations may include, but are not limited to, reply, forward, delete, archive, and the like. The specific email operations may include, but are not limited to, assigning tasks and tags. In some embodiments, the list view also allows for bulk operations to select items and move them to another client account, share if appropriate, or the like. The plurality of accounts may be further categorized into least on a combination of flags, tasks, bookmarks, categories and tags which will be explained further with references to FIGS. 5A and 5B.

In one scenario, the client application 124 allows the user of the client account (e.g., the client account 302) who is not a recipient on the original mail to notice the email in the client account 302 or the shared mailbox and decides to reply. For instance, the client user 304 may send an email to only the user 102a of the client account 302. As explained above, the email copied to the client account 302 provides access to all the users of the client account 302. This allows the user 102b who is not copied in the original sent by the client user 304 to perform the email operations. For instance, if the user 102b replies to the email of the client account 302. In this scenario, the module 218 adds an implicit forward message in a reply email to the email of the client user 304. The implicit forward message is included in the reply email based on determining whether the reply email is initiated by a user (e.g., the user 102b) who is not copied in the incoming email received in the client account 302. The client application simulates the subject of the reply email from the user 102b by adding the implicit forward message as "Re: FW: <subject>". Further, the implicit body message along with the implicit forward message in the reply email may be as follows:

Re: FW: <subject>
- - - -Forwarded Message- - - -
From: "user 102a"<email1@company.com>
To: "user 102b"<email2@company.com>
Subject: "< >"
- - - -Forwarded Message- - - -
From: "client user 304"<clientmail@gmail.com>
To: "user 102a"<email1@company.com>
Date: "< >"
Subject: "< >"
 [ . . . original message . . . ]

From the above, it is understood that the reply email from the user 102b will have the subject from the client user 304 to make it look like the user 102b is replying to a forwarded email. This reduces email overload and still allows any users in the client account 302 to be able to reply to any email in the client account 302.

Further, the module 218 renders an option in the client application 124 for sending bulk emails. The users 102a-102n can create templates for various bulk messages in one client account or organize them into multiple client accounts by topic. In particular, the user (e.g., the user 102a) may provide user inputs related to a group of client accounts. The group of clients may be selected among the plurality of client accounts 106a-106n, the category and set values associated with one or more properties of each client account of the plurality of client accounts 106a-106n. The categories may include, but are not limited to, personal tax filers, corporate tax filers and the like. Further, the properties may include for example, such as salutation, "Dear Mr. Jones" which may be substituted for the respective client user. Thereafter, the module 218 creates a bulk email to the group of client accounts by substituting the set values for the one or more properties for each client account as explained above. The module 218 transmits the bulk email to the group of client accounts. Further, each email of the bulk mail transmitted to the group of client accounts is reflected in the corresponding client account of the group of client accounts in the client application 124 for providing shared view to the users 102a-102c as explained above. In other words, the bulk emails can be sent conveniently as though the emails were sent from each client account with appropriate set values substitution to facilitate replies coming back to the client account and for the context for staying complete. Similarly, when the client user replies to the email sent as a part of the bulk email, the reply email from the client user is assigned to their respective client account. Also, the bulk mail is saved in each of the client accounts of the recipients, so each client account has context for what emails were sent and what replies were received.

The notification module 222 includes suitable logic and/or interfaces for transmitting real-time notifications to alert the user about the occurrence of an activity in the client account. In one example, the activity is related to receipt of the incoming email in the client account. For instance, the client account 302 is associated with the users 102a and 102b. In this scenario, the notification module 222 transmits the notification to the users 102a and 102b when there is an incoming email in the client account 302. The real-time notifications minimize interruptions and streamline workflow for efficiency. It provides the users with the ability to manage their incoming and outgoing email.

Typically, the real-time notifications are sent out to the user at several different levels. In one scenario, when a user is logged in, a notification can be displayed through the user interface that indicates a new activity for each section (e.g., the shared and unshared email sections) of their client accounts. In addition, the notification module 222 may be integrated into a browser or provide the client application 124 notifications to indicate the activity to the user even when their attention is directed away from the service. In one example, if the user 102a or 102b has not acknowledged the email from the client user 304 in the client account 302 for more than 24 hours, the notification module 222 alerts the users 102a and 102b of the corresponding client account 302 by providing the notifications. In another example, the user can set to receive a notification when they have not logged into the client application 124 for more than 48 hours.

The notification module 222 provides the notifications at the account level with additional details about whether the activity for the client account (e.g., the client account 302) is related to new unshared emails, shared emails, tasks, chat, or a change in the metadata for the client account 302. The notifications related to unshared emails, tasks, chat and metadata change are triggered by actions of the users 102a and 102b of the client account 302. Further, the notification related to shared emails or incoming emails to the client account 302 is triggered automatically.

In addition, the notification module 222 provides a notification in the client application 124 for alerting the user about the initiation of background processing of the email related actions being performed by the user as explained above. In this scenario, the module 218 performs the email related actions asynchronously. Also, the notification module 222 alerts the user when the background processing of the email related actions is completed in the corresponding client account.

In an embodiment, the notification module 222 provides notifications that are color coded to indicate an importance level of the activity or the tasks, etc., to the user receiving them. For example, red notification symbols may be used to indicate that the user has been marked as needing to take action in a particular section of the client account 302, and green notification symbols may be used to indicate new activity that is either targeting a different user, or no particular user of the client account 302. It is to be noted that the notifications show up in the client application 124 when the user views the particular client account 302 and are indicated by the color coding of each section tab for the client account 302. Further, the notifications can be cleared when the user views the items that triggered the notification, or when they utilize a feature in the user interface to clear all their notifications at once.

The notification module 222 may transmit notifications via short messaging protocols based on user selection of the aforementioned option for receiving the notifications in the client application 124. As a result, the notification module 222 transmits real-time notifications via the short messaging protocols (such as, Short Messaging Service (SMS), or text messages) based on determining the above-mentioned activities in the particular client account. For example, the user for the particular client account can use option for receiving an SMS notification on their phone whenever a new unshared or shared email is assigned to their client account. The method described herein further provides a user to receive an SMS notification when certain actions have not taken place in a designated amount of time.

In addition, the application server 200 provides services of the client application 124 based on the user selection of one or more usage preference options in the client application 124. As explained above, the centralized emails are copied to shared mailbox and the clustering by client users is implemented as folders within the shared mailbox. The application server 200 provides the services of centralizing the emails from the client users to all participating staff members (or the users 102a-102c) within the institution 110. However, the users may select the usage preference options in the client application 124. The usage preference options may include at least a read-write option, a read-only option, and a partial-read-only option. The application server 200 enforce whether that the one or more mailboxes of the at least one user 102a-102c is not linked with emails from the plurality of clients 106a-106n that are assigned to the shared mailbox and organize the one or more mailboxes of the at least one user 102a-102c corresponding to the shared mailbox of the institution 110.

In an embodiment, the application server 200 may select the read-write option by default, once the user registers in the client application 124. Further, the user may choose the usage preference options such as the read-only option. For instance, some of the users (e.g., the user 102c) may be resistant to using the client application 124 for managing their emails and prefer to stay with their previous mode or rely on their mailbox of the organization. The user 102c may use the read-only option and adapt to the client application 124 over time and may opt for the read-write option. The difference between the read-write option and the read-only option is explained using the following example:

Example: Let Client1 (client1@email.com) send an email to a user1 (user1@company.com) who has chosen the read-write option and a user2 (user2@company.com) who has chosen read-only option. Further, the shared mailbox includes all the centralized emails in shared@company.com.

The shared mailbox will have a folder "Folder-f-24-301Client1" which is a unique folder for Client1. In this scenario "f" stands for folder and 24 may be a unique code (e.g., database ID) for the institution 110 and "301" may be a unique code for the client account. This combination will make this folder unique, even if there are two client users with the same name. Further, the user1's mailbox will also have "Folder-f-24-301Client1" folder. However, since the user2 has chosen the read-only option, no such folder will be created for the user2.

Let's say this client account is set to auto-share, so all the Client1 emails are automatically shared to the "Folder-f-24-301Client1" folder of the shared mailbox and the client account in the client application 124 for the user with the read-write option. However, the above service is not provided to the user2, as the user2 has selected the read-only option. In fact, the email from the client1 is saved in the user2@company.com mailbox associated with the user2.

In case of the partial-read-only option the mailbox remains unchanged, but the client emails are copied instead of being moved to their local client folders as mentioned above. Thus, automatic organization of the mailbox is facilitated for the user who has opted for the partial-read-only option in the client application 124. The user may access the emails in the corresponding client folders of the client account.

In addition, the application server 200 is configured to render a one way access mode for enabling a supervisor (such as the user 102d) of the institution 110 to monitor the plurality of client accounts without intervening the operation of the at least one user 102a-102c while managing their incoming email from the plurality of client users 106a-106n in the client application 124. This corresponds to supervisory monitoring of the client emails across the institution 110. More specifically, the user 102d (i.e., supervisor) is required to monitor what's going on, ensure that every client user is getting quality service, balance the workload, provide guidance and constructive feedback to the users 102a-102c on how they're doing, and handle escalations quickly. To that effect, the application server 200 enables the user 102d to get full access to all client accounts which is referred as the one way mirror more. Thus, the user 102d can access any client account and check the emails without being explicitly given access to the client account by the creator of the client account. The user 102d accessing the client accounts assigned to the user (e.g., the user 102a) is unknown to the user 102a.

In one embodiment, the application server 200 may provide one or more client users of the client account, an access to a subset of emails and metadata associated with the client account. For example, the client account 302 may include 100 emails including incoming and outgoing email, in which the subset of emails of about 10 among the total number of emails and the metadata in the client account 302 are accessed by the one or more client users (such as the client users 304 and 306) of the client account 302. This allows real-time monitoring of the client account 302 to the one or more client users. It is to be noted that the creator (i.e., the user 102a or 102b) of the client account 302 may provide inputs in the client application 124 for providing access to the subset of emails and metadata of the client account to the one or more client users of the client account. In this case, the application server 200 may shield the internal notes/discussions associated with the subset of emails that are accessible by the one or more client users.

In an embodiment, the application server 200 may determine outbound emails associated with the client account (such as the client account 302). In this scenario, the application server 200 may populate a set of template emails with information of the one or more client users (i.e., the client users 304 and 306) of the client account 302 in response to outbound emails associated with the client account 302. The set of template emails may be stored in the database 204 and accessed in response to determining the outbound emails in the client account 302. Some examples of the set of template emails of the client account 302 may include, new loan request, tax questionnaire and the like.

In addition, the application server 200 may check the mailboxes of the users 102a-102c to determine a magnitude of overlap in terms of carbon copy (Cc):, blind carbon copy (Bcc). Thereafter, the application server 200 may estimate time saved by organizing such emails in the client application 124 for each of the users 102a-102c of the institution 110. Also, the application server 200 may estimate time saved by sequencing work items to minimize context switching cost.

Figure 4:
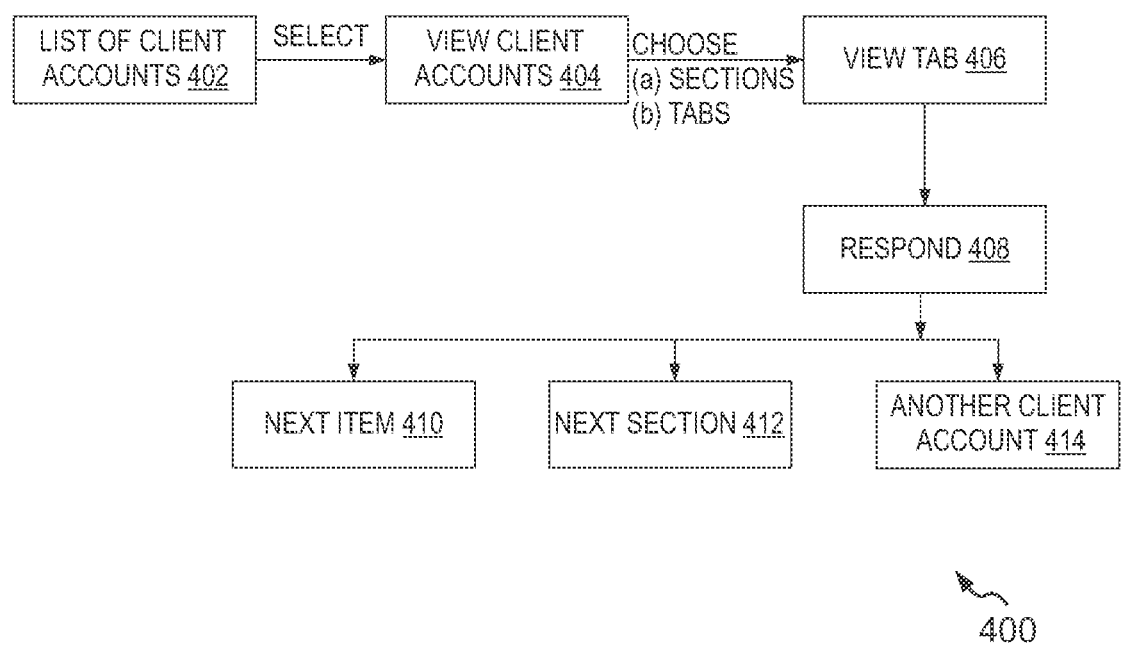
FIG. 4 illustrates an example representation of a workflow performed by a user in the client application for managing and organizing the emails, in accordance with an embodiment of the present disclosure.

FIG. 4 illustrates an example representation of a workflow 400 performed by a user in the client application 124 for managing and organizing the emails, in accordance with an embodiment of the present disclosure. As shown, the user (e.g., the user 102a) may be provided with a list of client accounts (see, 402) associated with the user 102a in the client application 124. As such, the user 102a may select a client account from the list of client accounts 402 by providing a selection input (i.e., click or tap) on the corresponding client account. It is to be noted that each client account is listed with its name, category and notification flags which will be explained further with reference to FIGS. 5A and 5B. In an embodiment, the list of client accounts may be sorted in a variety of ways including category and combination of flags. This allows the user 102a to prioritize the tasks based on the client account category or flags. Some examples of the categories and flags include, but are not limited to, tags, red flags, green flags, tasks, lists, bookmarks or favorites, search name/client name/email address, and name.

Upon selection of the client account, the user 102a may view the client account (see, 404). The client account may include a plurality of sections such as tab, shared emails, unshared emails, task, about, etc. The user 102a may provide a selection input on any one of the section to view the items in the section associated with the selected client account (see, 406). For instance, the user 102a selects to view tab (see, 406) and can then view or respond appropriately (see, 408). In one scenario, the user 102a may choose to move to the next item in the selected section (see, 410). In another scenario, the user 102a may choose to move to the next section of the selected client account (see, 412). In another scenario, the user 102a may choose to move to another client account (see, 414).

For example, the user 102a may be assigned to 100 client accounts. Further, on a particular day, there was activity and hence red flags for the user 102a in few client accounts (e.g., client accounts 106a, 106b, 106c and 106d). The activity was new emails for the client accounts 106a, 106b and 106c and a new task is assigned to the user 102a for the client account 106d. In this example scenario, the user 102a is required to visit all the client accounts 106a-106d. Thus, for the client accounts 106a, 106b and 106c, the user 102a may click on the shared email section and checks the new emails in the aforementioned client accounts. In one example scenario, the user 102a may click on a red flag and be directed to the shared emails section tabs for the aforementioned client accounts. Further, the user 102a may click on the tasks section for the client account 106d to view the task and handle it. Thus, it is evident that the above-mentioned example scenario implements the workflow 400 for performing necessary actions to organize and manage the emails in the client application 124.

Figure 5:
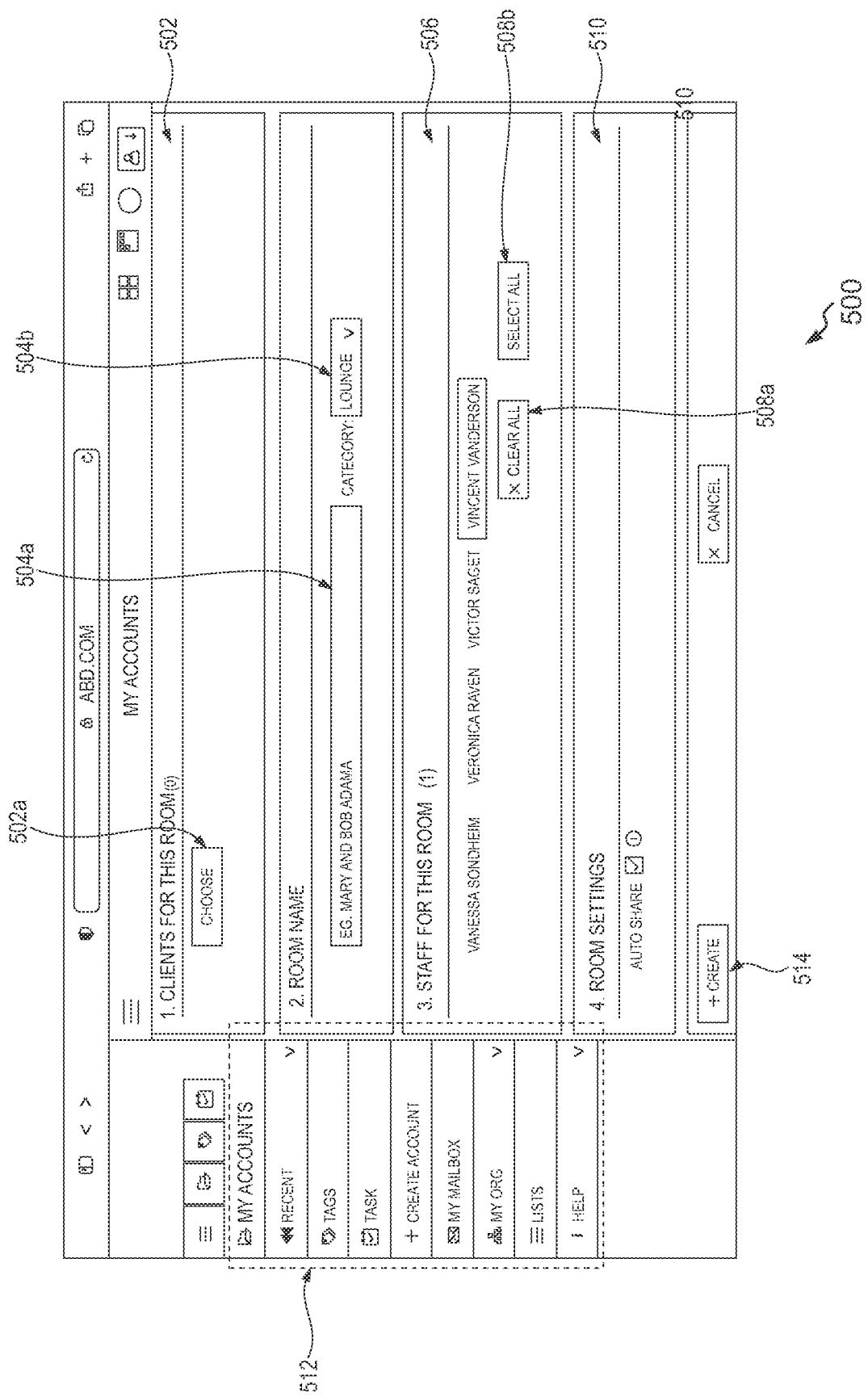
FIG. 5 illustrates an example representation of a user interface (UI) depicted in the client application for creating a client account in the client application, in accordance with an embodiment of the present disclosure.

FIG. 5 illustrates an example representation of a user interface (UI) 500 depicted in the client application 124 for creating a client account, in accordance with an embodiment of the present disclosure. The UI 500 is depicted to a user such as the user 102a for creating the client account in the client application 124 upon providing input an option listed in a menu section 512.

The UI 500 is depicted to include a plurality of data fields for receiving inputs related to the client users for creating the client account. In particular, the UI 500 is depicted to include a data field 502 for receiving inputs regarding the client users. The inputs may include, but not limited to, name and email address of the client users. In one scenario, the user 102a may manually enter the above information in the data field 502. In another scenario, the user 102a may select the contact information of the client users by clicking on a button 502a associated with the text "CHOOSE". In this scenario, the user 102a may be rendered with the client users of the institution 110 and their contact information. As such, the user 102a may select the client users for the client account.

Further, the user 102a may provide a name for the client account in a data field 504a. The user 102a can also select a category of the client account by providing inputs on a drop down menu 504b in the UI 500. Upon clicking on the drop down menu 504b, the user 102a may be provided with a drop down list including categories (not shown in figures) for user selection. Thereafter, the user 102a may assign the users for the client account by providing inputs in a data field 506. In one scenario, the user 102a may manually enter the contact information (e.g., name or email address) of the users in the data field 506. In another scenario, the client application 124 may render the users information of the institution for user selection. The user 102a may either select at least one from the rendered list or may select all by providing inputs on a button 508b. Further, the user 102a may deselect the users that are selected for the client account by providing input on a button 508a.

The user 102a further provides information related to sharing option in the UI 500. More specifically, the UI 500 depicts a sharing option 510. The user 102a may select the sharing option 510 for facilitating auto-sharing of the emails as explained above. Further, if the sharing option 510 is not selected by the user 102a, the sharing option for the client account is selected as manual sharing. Upon providing the aforementioned inputs in the UI 500, the user 102a may provide inputs on a button 514 for creating the client account.

FIG. 6A illustrates an example representation of a user interface (UI) 600 depicting a plurality of client accounts sorted based on categories in the client application 124, in accordance with an embodiment of the present disclosure. The UI 600 may be depicted to a user (e.g., the user 102a) in the client application 124. The UI 600 is depicted in the client application based on a user selection of an option (exemplarily depicted as "My Accounts") listed in the menu section 512. In one embodiment, the UI 600 may be depicted as a homepage in the client application 124, once the user 102a login to the client application 124.

The UI 600 is depicted to include a list of client accounts 602. The list of client accounts 602 includes a plurality of client accounts 106a-106n as explained with reference to FIG. 1. The plurality of client accounts 106a-106n includes 151 client accounts (as shown in FIG. 6A). Further, each client account is listed with its name, category and notification flags. The list of client accounts 602 may be sorted in a variety of ways including category and combination of flags. As shown, the client accounts in the list of client accounts 602 are sorted based on category options (see, 604). For example, the category options are depicted as "PROSPECT", "WTGFORSUB", and the like. This enables the at least one user to prioritize the emails assigned to flags, tasks, bookmarks, category and tags.

As explained above, the list of client accounts 602 allows the user of the corresponding client account in the list of client accounts 602 to acknowledge the email in the category or flags. Further, the user 102a may also filter the client accounts in the list of client accounts 602 by the combination of flags and fragments or client account name or client user names or email address of the client users, and the like. More specifically, the user 102a may provide selection input on a drop down menu 606 to provide inputs related to filtering the client accounts in the list of client accounts 602. Upon providing input on the drop down menu 606, the user 102a may be prompted with a drop down list including filtering actions as listed above (not shown in figures). As such, the user 102a may select either on other option from the list of filtering options for filtering the list of client accounts 602.

Figure 6B:
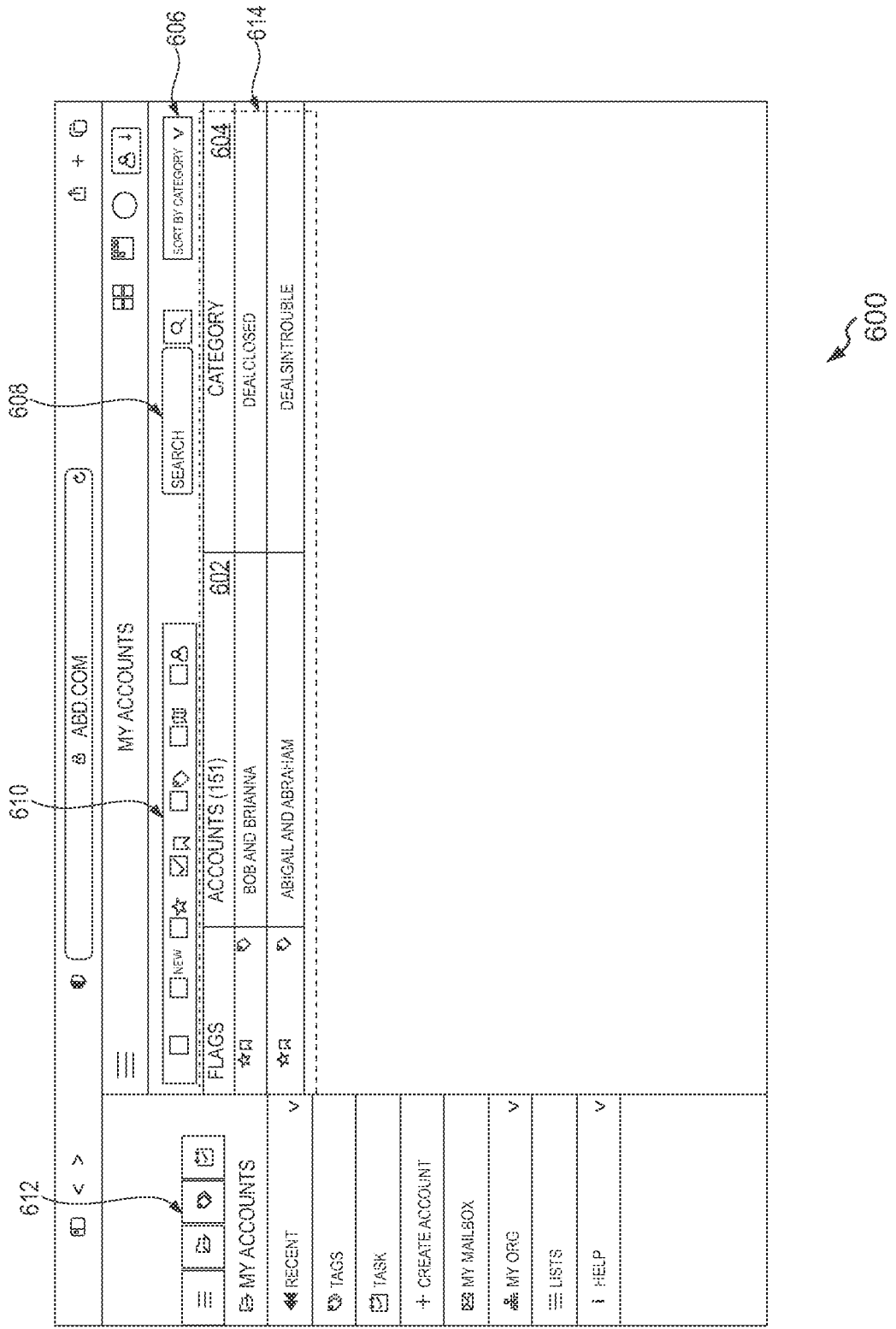
FIG. 6B illustrates an example representation of the user interface (UI) of FIG. 6A depicting bookmarked client accounts in the client application, in accordance with an embodiment of the present disclosure.

Further, the user may search an email or a client account or a client user from the list of client accounts 602 by providing appropriate inputs regarding the above-mentioned details in a search field 608. In addition, the user can sort the client accounts (that is accessible) by name of the client account, category of the client account, tags, favorites and bookmarked, last updated date, last visited date, and by which client account involve new activity notifications. More specifically, the UI 600 is depicted to include a section 610. The selection 610 includes multiple sorting options for sorting the list of client accounts 602. The multiple sorting options may include, name of the client account, category of the client account, tags, favorites and bookmarked, last updated date, last visited date, and by which client account involve new activity notifications. In one scenario, the user 102a may provide an input (i.e., click or tap) on a bookmark option listed in the sharing option 510 to view bookmarked client accounts 614 (as shown in FIG. 6B). Upon providing the input (represented using a "Tick Mark") on the bookmark option, the UI 600 depicts the bookmarked client accounts 614 (as shown in FIG. 6B). Further, for each client account accessible to the user 102a, the user 102a may include a note that is visible to the user 102a. In addition, the user 102a may view the tags along with the list of client accounts 602 in the UI 600 (not shown in Figures) by providing inputs on an actionable icon 612 of the UI 600.

Figure 7A:
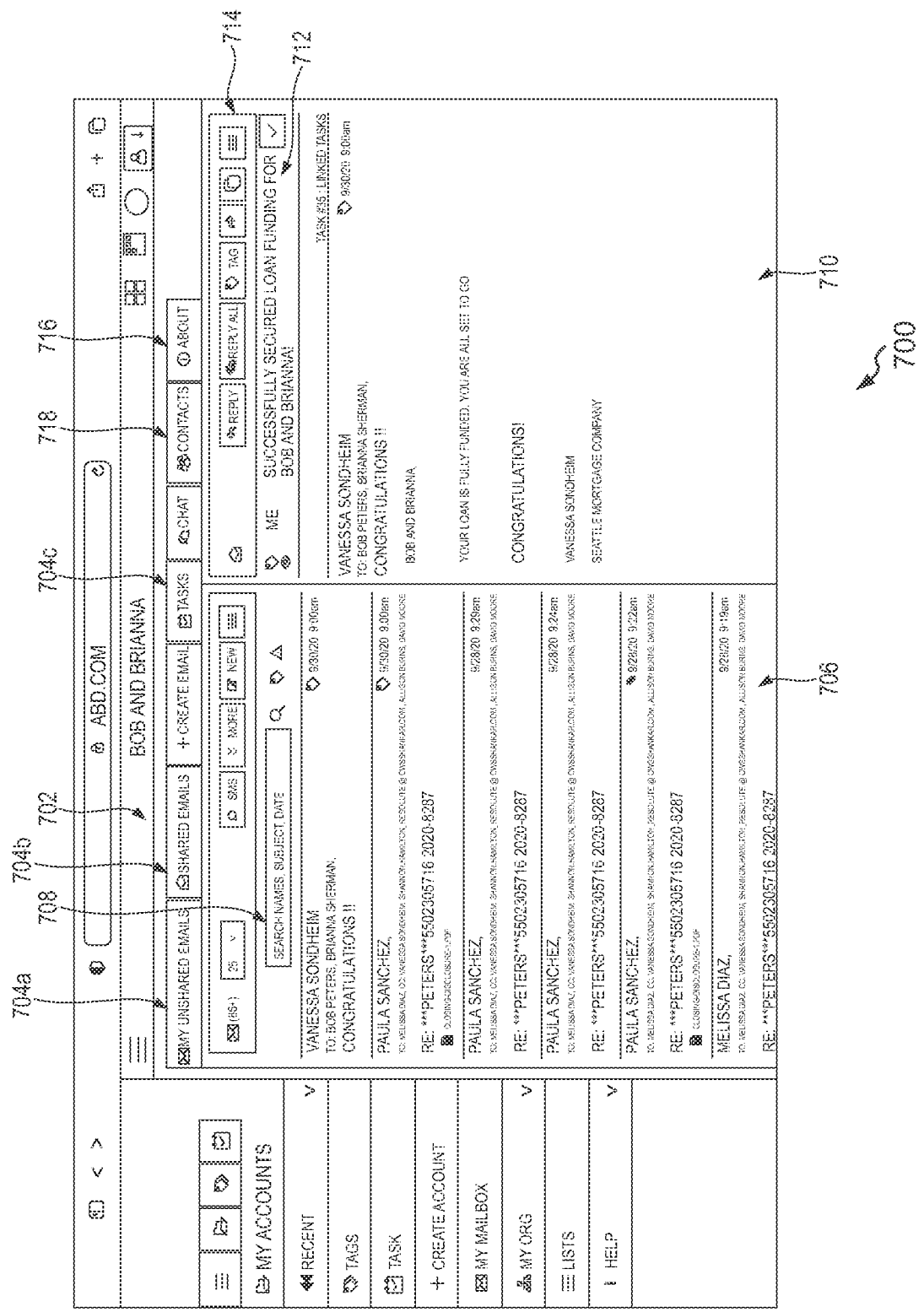
FIG. 7A illustrates an example representation of a user interface (UI) depicting a client account selected from the list of client accounts in the client application, in accordance with an embodiment of the present disclosure.

FIG. 7A illustrates an example representation of a user interface (UI) 700 depicting a client account selected from the list of client accounts 602 in the client application 124, in accordance with an embodiment of the present disclosure. The UI 700 is depicted in the client application 124, upon user selection of a client account from the list of client accounts 602. The UI 700 is depicted to include a header section 702. The header section 702 depicts a name of the selected client account (exemplarily depicted as "BOB AND BRIANNA").

The UI 700 further includes a plurality of sections. The plurality of sections includes at least an unshared email section 704a, a shared email section 704b, and a tasks section 704c. The UI 700 depicts the shared email section, upon user selection of the shared email section 704a in the UI 700. Alternatively, the user 102a may be rendered with the UI 700 depicting the shared email section of the client account upon selecting the client account from the list of client accounts 602. The shared emails section 704a displays shared emails and details of the selected emails. In particular, the UI 700 is depicted to include a list of emails 706. The list of emails 706 in the shared email section 704a is a part of auto-share option or shared manually from other section or from another client account as explained above. The list of emails 706 includes emails (i.e., sent emails, incoming or received emails, or forwarded emails, etc.) associated with the selected client account. Further, the user 102a may search emails from the list of emails 706 by recipient names, email subject, or email sent date by providing inputs in a search field 708 of the UI 700.

The user 102a may select an email from the list of emails 706 by providing inputs (i.e., clicks) on the email. The selected email is depicted in an email section 710 of the UI 700. In other words, the user 102a views the selected email in the email section 710. It is to be noted that the email associated with the name "VANEESA SONDHEIM" is selected from the list of emails 706 and is viewed in the email section 710. The name associated with the email is a name of the user of the institution to whom the email is associated to, in the assigned client account "BOB AND BRIANNA". Further, the email section 710 is depicted to include an email header field 712. The email header field 712 is depicted to include tags (exemplarily depicted as SUCCESSFULLY SECURED LOAN FUNDING FOR BOB AND BRIANNA!) for the selected email. In this scenario, the tag is included as a note to the user itself (indicated as "ME" in the email header field 712).

Further, all the users of the client account are notified upon the occurrence of email related activities in the client account as explained above. Thus, any user of the client account is able to review the email and/or address the email or the tag, thereby minimizing the email from being looked by the other users of the client account. For example, if the first reviewing user of the client account address the email and marks the email as read, it will prevent interruptions to other users for relooking into the reviewed email.

Further, the UI 700 is depicted to include an email operations section 714. The email operations section 714 includes a combination of standard and specific email operations as explained above. The user 102a may provide inputs in any of the email operations listed in the email operations section 714 for performing email operations such as reply, forward, delete, archive, assigning tasks and tags in the selected email.

Furthermore, the user 102a may view the unshared emails by clicking on the unshared email section 704a. The operations involved in viewing the unshared emails and performing the email actions are explained with reference to FIG. 2, therefore they are not described again for the sake of brevity. The user 102a may also access/view the contacts or connections associated with the selected client account by providing input on a contacts tab 718 in the UI 700.

Figure 7B:
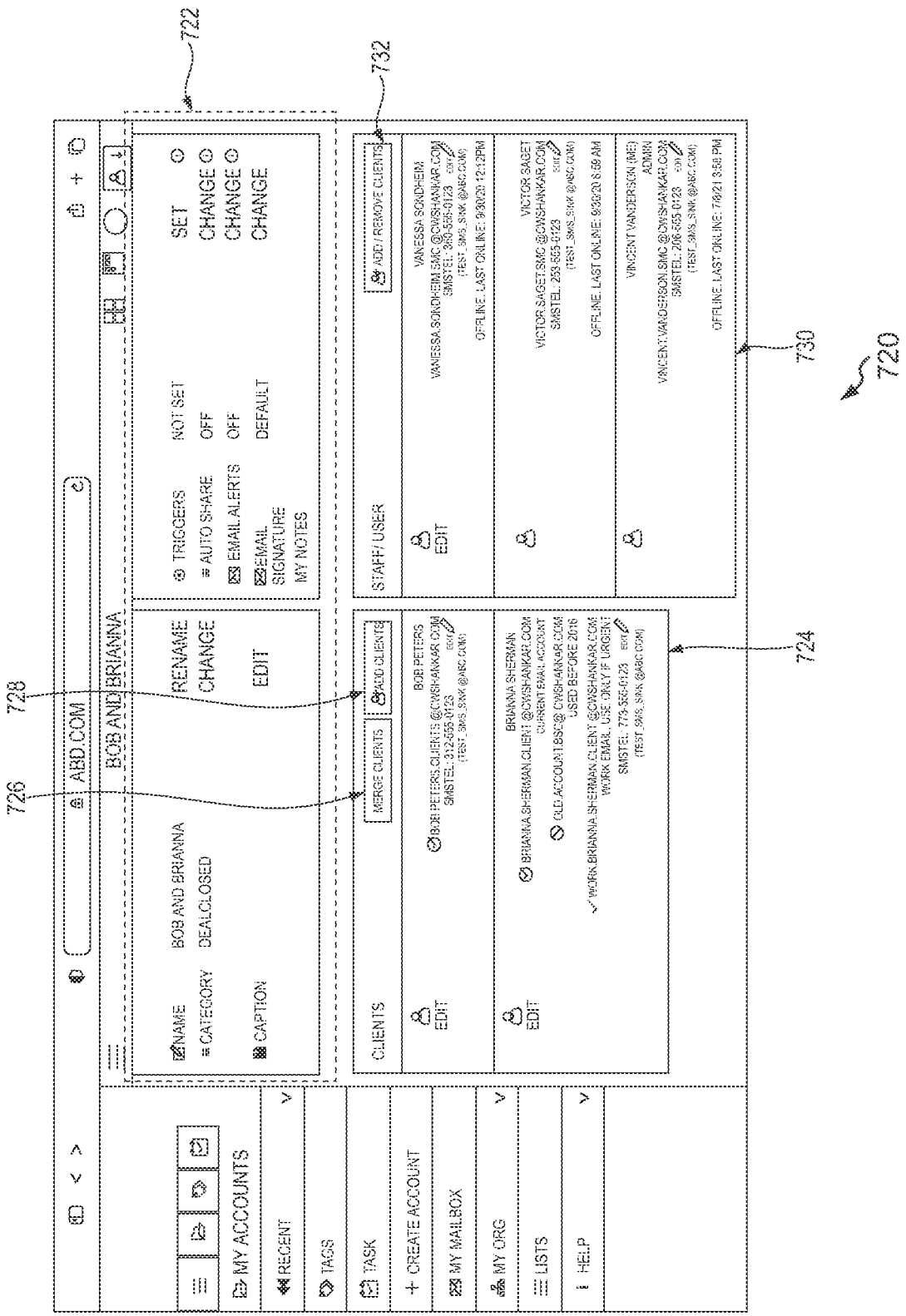
FIG. 7B illustrates an example representation of a user interface (UI) depicting an about tab in the client application, in accordance with an embodiment of the present disclosure.

FIG. 7B illustrates an example representation of a user interface (UI) 720 depicting an about tab in the client application 124, in accordance with an embodiment of the present disclosure. The UI 720 corresponds to a bio tab or a basic information tab in the client application 124. The UI 720 is rendered in the client application 124 upon providing selection input (clicks) on a tab 716 associated with the text "ABOUT" in the UI 700.

The UI 720 is depicted to include a basic information section 722. The basic information section 722 includes information related to the client account (e.g., BOB and BRIANNA) such as the client account name, category, caption, trigger words or phrases (i.e., content identifiers), auto-share details, email signatures and internal notes. Further, the basic information section 722 includes editing tools for each of the above-mentioned information listed in the basic information section 722. The user 102a may edit the information for the client account by using the editing tools associated with the corresponding information in the basic information section 722. For example, the user 102a may wish to set triggers or add additional triggers or delete triggers by providing inputs on a the editing tool "SET" associated with the information "TRIGGERS" in the basic information section 722.

The UI 720 is further depicted to include a client user information section 724. The client user information section 724 includes information related to the client users of the client account. For example, the client account is BOB and BRIANNA. Thus, the information related to the client users BOB and BRIANNA is depicted in the client user information section 724 of their client account. The information of the client users may include, but not limited to, full name of the client users, contact information (e.g., email address, phone number, etc.), details regarding usage time of the email address and the like. Further, the user 102a may add one or more client users of the institution 110 to the client account by using an option 728 associated with the text "ADD CLIENTS". Upon providing inputs on the option 728, the user 102a may be rendered with a list of client users of the institution 110 for user selection to add in the client account associated with "BOB AND BRIANNA". Furthermore, the user 102a may merge the client account ("BOB AND BRIANNA") with any other client account from the list of client accounts 602 by using an option 726 associated with the text "MERGE CLIENTS". In an embodiment, the option 726 allows the user 102a to merge the client users within the selected client account.

Further, the UI 720 is depicted to include a user information section 730. The user information section 730 includes information related to the users assigned to the client account (e.g., BOB and BRIANNA). The information of the users may include, but is not limited to, full name of the client users, contact information (e.g., email address, phone number, etc.), active status, and the like. Further, the creator (or any user) of the client account may add/remove users in the client account by using an option 732 associated with the text "ADD/REMOVE USER". In addition, any of the user 102a is allowed to edit the information in the user information section 730 and the client user information section 724 by using editing tools (exemplarily represented as a user icon associated with the text "EDIT") in the user information section 730 and the client user information section 724.

Figure 7C:
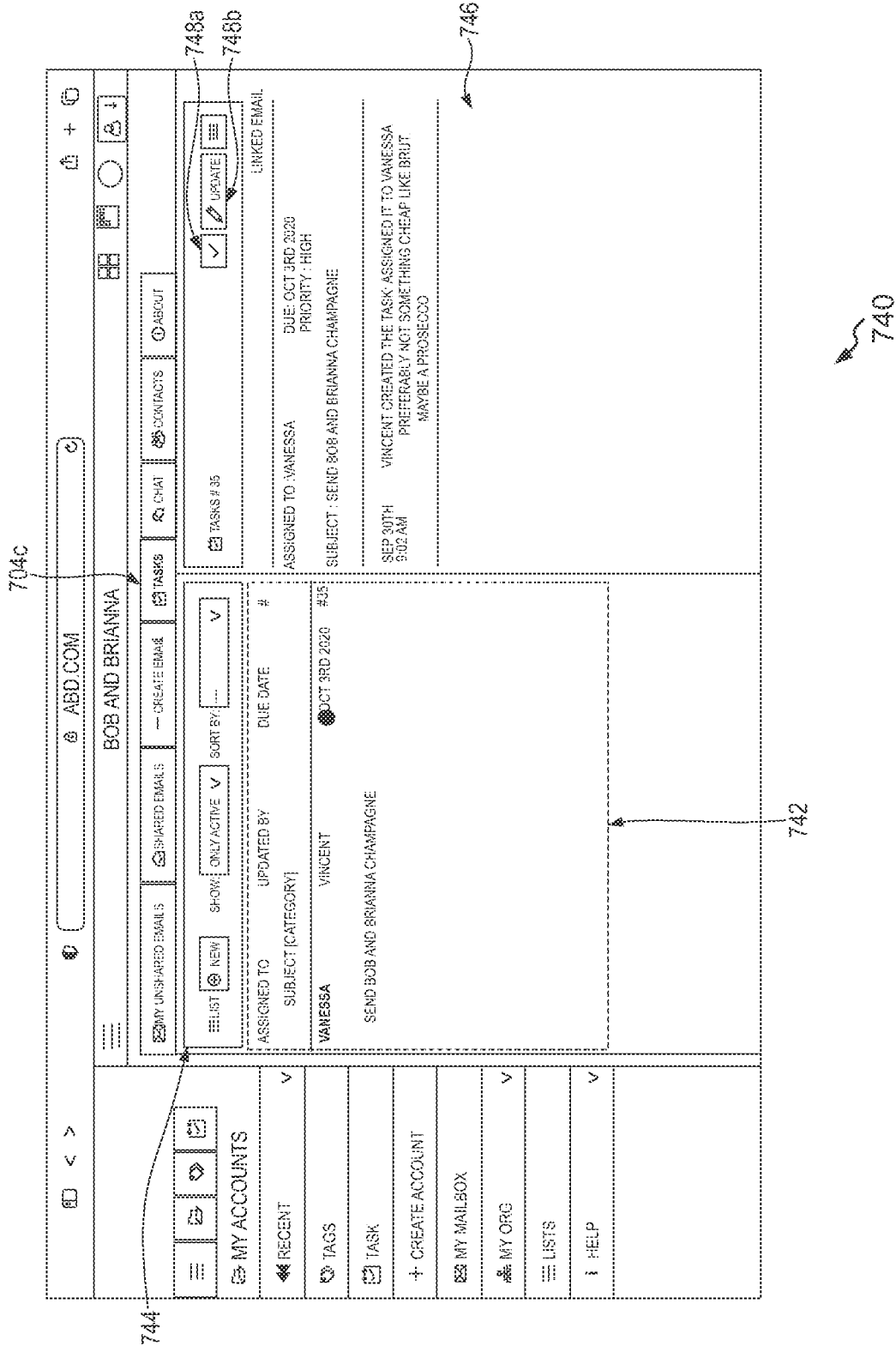
FIG. 7C illustrates an example representation of a user interface (UI) depicting a task section in the client application, in accordance with an embodiment of the present disclosure.

FIG. 7C illustrates an example representation of a user interface (UI) 740 depicting a task section in the client application 124, in accordance with an embodiment of the present disclosure. The UI 740 is rendered in the client application 124 upon providing selection input (clicks) on the task section 704*c* in the UI 700.

The UI 740 is depicted to include a task list section 742. The task list section 742 includes tasks assigned in the client account. The task list section 742 provides a detailed view and allows scanning of all the tasks, figuring out the ones that need the user's attention and later providing details and ways to update the task which is explained further in detail. In general, a list of tasks is used as a starting point to dive into emails.

For illustration purposes, the task list section 742 is depicted to include only one task assigned to a user (exemplarily depicted as "VANESSA") who is associated with the selected client account. Further, the tasks can be associated with the client account or the email within the client account. The tasks allow a user to generate custom work items and assign them to other users of the client account or the institution 110. The user can create a task for a particular client account with a message outlining what needs to be done, set a due date for the task, and assign other user of the client account to complete the task. As shown, the task depicted in the email is assigned to the user "VANESSA" which is created by a user "VINCENT". The task in the task list section 742 also includes the due date (exemplarily depicted as "Oct. 3, 2020"). Thus, once the task is created in the client account, all the users of the client account can access it by selecting the task section 704*c* of the corresponding client account.

Further, the UI 740 is depicted to include a task filter section 744. The task filter section 744 includes one or more options such as a list view option, an active status option, and a sort view option. The user 102*a* may utilize to apply filter for viewing the tasks assigned in the client account by using the options listed in the task filter section 744. For example, the user 102*a* wishes to view the tasks which are completed and active in the selected client account. In this scenario, the user 102*a* utilizes the active status option in the task filter section 744 to apply a filter related to viewing the tasks that are completed and currently active for the client account.

Further, when the user selects the task, the UI 740 depicts the selected task and the corresponding email in a task view section 746. In one scenario, the user 102*a* can mark the task as complete by providing inputs on an actionable icon 748*a* of the UI 740. Once, the task is marked as complete, the task is de-emphasized from the UI 740. In another scenario, the user 102*a* may append additional messages to the original message for updates or clarification by using an option 748*b* of the UI 740. In an embodiment, the user 102*a* may reassign the task to another user in case the task is unrelated to the user or if the next step requires the action of the other user of the client account.

Figure 7D:
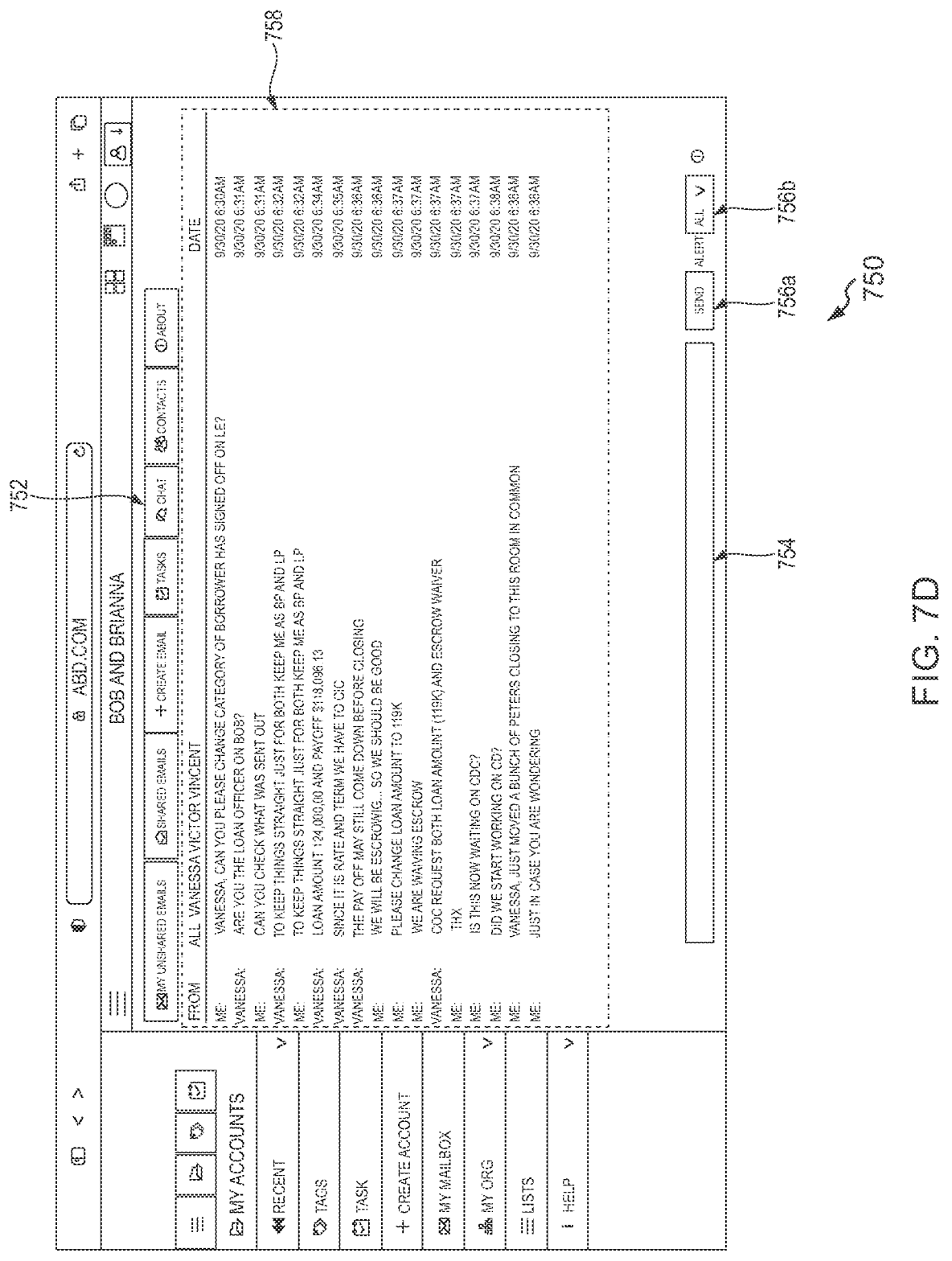

FIG. 7D illustrates an example representation of a user interface (UI) 750 depicting a chat tab in the client application 124, in accordance with an embodiment of the present disclosure. The UI 750 is rendered in the client application 124 upon providing selection input (clicks) on a chat tab 752.

The chat tab 752 provides a section of each client account for the users in that client account to send chat messages to each other. The UI 750 is depicted to include a data field 754 for allowing the user to type their chat messages. The user may send the chat messages to other users of the selected client account by clicking on a button 756*a* in the UI 750. Further, chat history (see, 758) is recorded and can be viewed at any point of time in the UI 750. As shown, the UI 750 is depicted to include chat conversation between the users exemplarily depicted as Vanessa, Victor and Vincent. The chat history (see, 758) can be accessed by all the users of the client account. Further, the user may set an option to notify either one or all the users of the client account by utilizing an option associated with a drop down menu 756*b*. This allows the chat messages to be directed to a particular user of the client account.

Figure 7E:
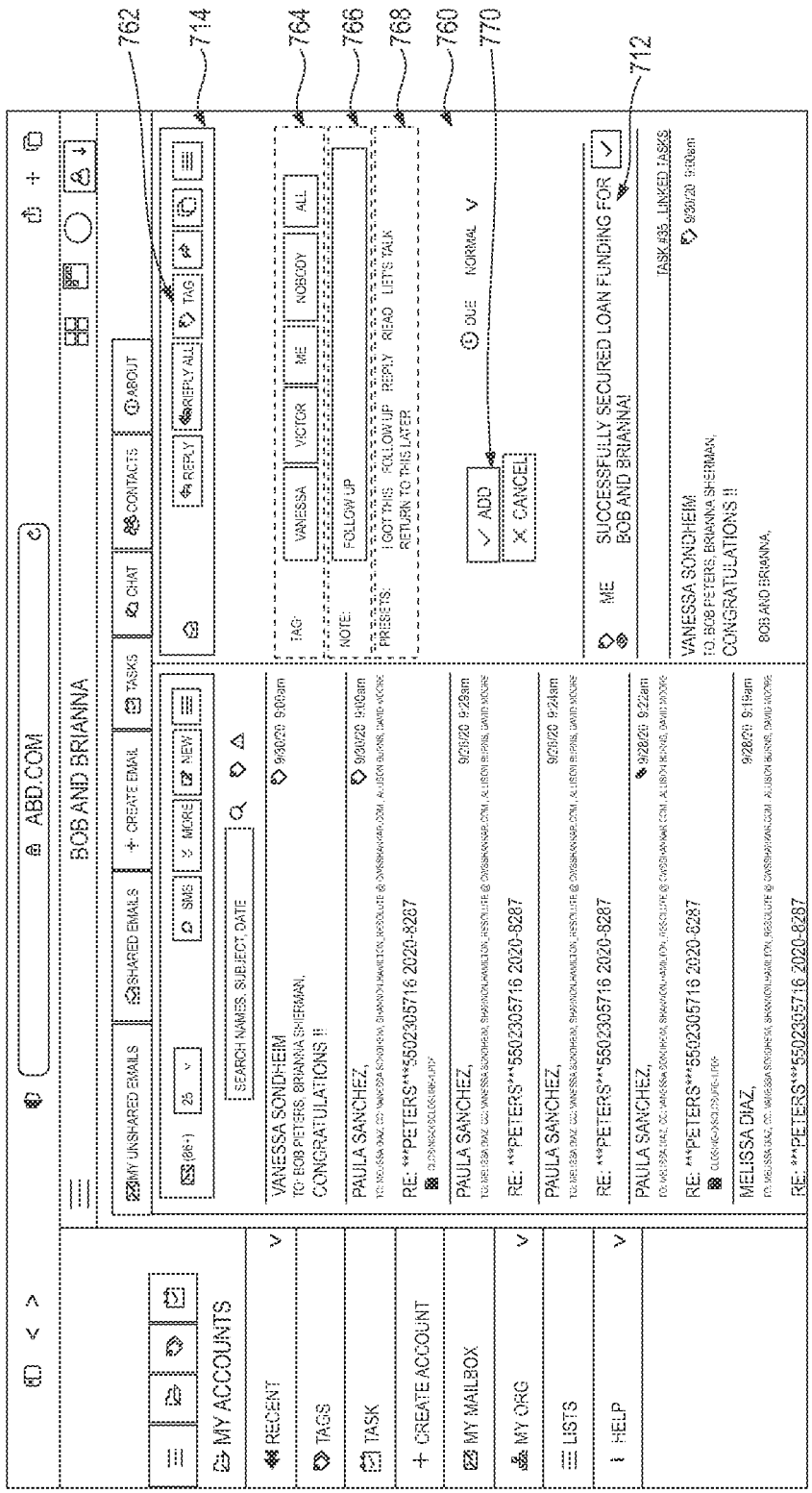
FIG. 7E illustrates an example representation of a layout depicted in the UI of FIG. 7A for adding a tag to an email, in accordance with an embodiment of the present disclosure.

FIG. 7E illustrates an example representation of a layout 760 depicted in the UI 700 for adding a tag to an email, in accordance with an embodiment of the present disclosure. The layout 760 is rendered in the UI 700 upon selecting an option 762 from the email operations section 714. As shown, the layout 760 is depicted in the UI 700 by moving the email section 710 below in the UI 700.

The user 102*a* can add a tag to the emails that typically conveys a note for themselves or to the other users of a particular client account by providing inputs in the layout 760 rendered in the UI 700. The note expresses a message to take actions on the tagged emails. The layout 760 is depicted to include a users list 764 for allowing the assignee of the tag to select the users for the tag. Thereafter, the user may provide inputs or messages or note in a data field 766 depicted in the layout 760. Additionally, a list of standard (predefined) tags (see, 768) can be created and updated for the institution 110 for quick application. Thus, the user 102*a* may select the predefined tags (see, 768) in the client application 124 or create a new tag in the client application 124 based on the emails by providing inputs in the data field 766. For example, the tag may include messages either predefined or created based on the emails such as, but not limited to, read this email, respond to the client by the end of the day and so on. The tag is created for the email or the client account upon providing a selection input on a button 770 associated with the text "ADD".

The tag for an email is visible to all the other users of the client account. This allows the users to accesses a particular email where the user has been tagged as explained with reference to FIGS. 6A and 6B. In this scenario, the user 102*a* may sort the emails based on tags and access the particular emails to respond. Thereafter, the client application 124 marks the tag as completed, once the necessary actions are performed as mentioned in the tag. In other words, the tags may track which users have viewed the email and its occurrence. Further, the tags may include due dates and priorities assigned to them. For instance, the priorities may be indicated using color coding scheme.

In some embodiments, the application server 200 is configured to highlight at least the incoming email and the outgoing email from the plurality of client users that are determined as untagged (not shown in figures). In this way, all the emails are either tagged, untagged or marked as tag not-needed. This allows the at least one user 102*a*-102*c* to manage the incoming and outgoing emails from the plurality of client users 106*a*-106*n* in the client application. In particular, highlighting the untagged emails in the client application 124 provides a deterministic process for the team (the at least one user 102*a*-102*c*) as a whole to ensure that nothing slips through the cracks.

Figure 7F:
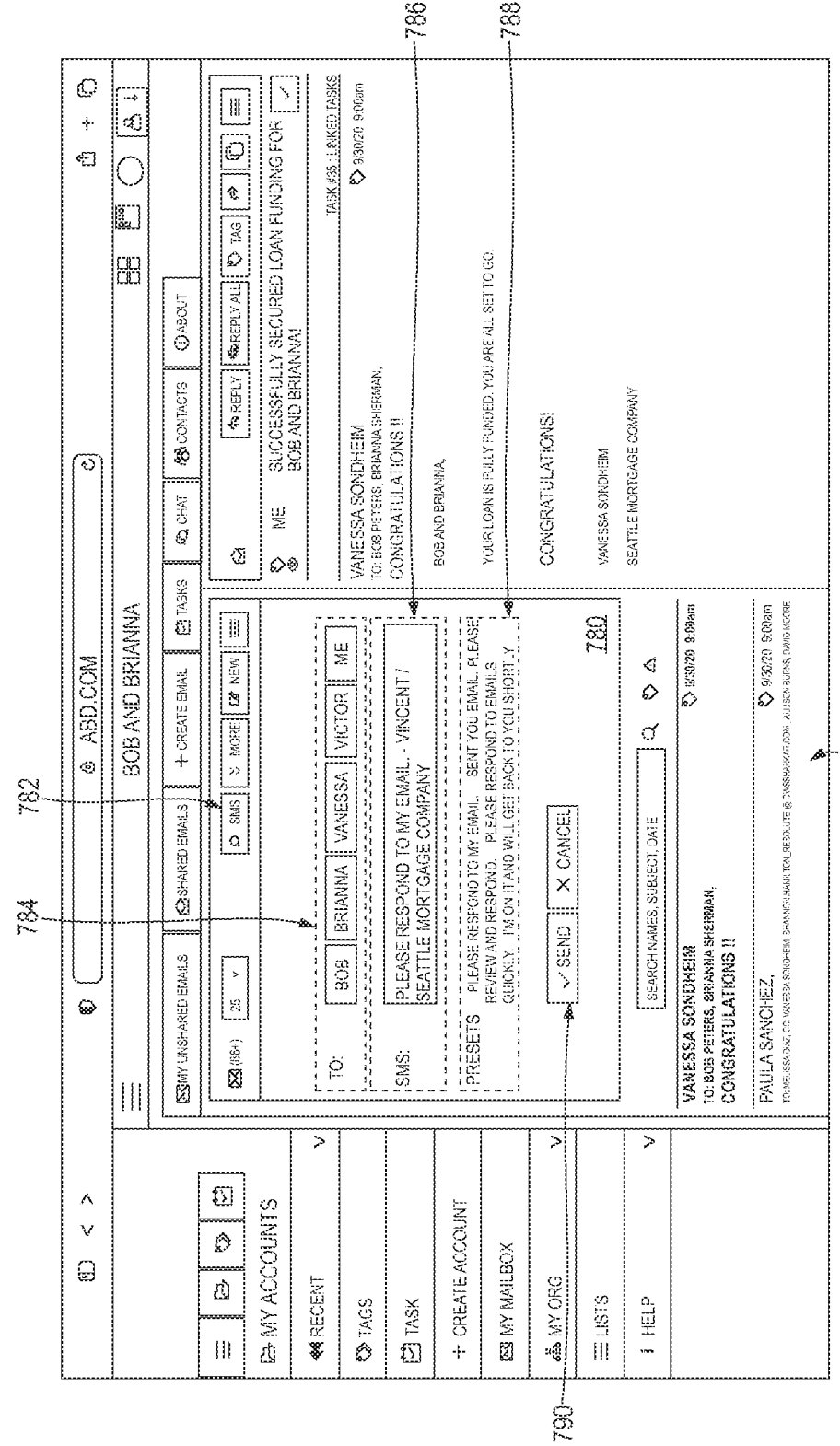
FIG. 7F illustrates an example representation of a layout depicted in the UI of FIG. 7A for adding a tag to an email, in accordance with an embodiment of the present disclosure.

FIG. 7F illustrates an example representation of a layout 780 depicted in the UI 700 for adding a tag to an email, in accordance with an embodiment of the present disclosure. The layout 780 is rendered in the UI 700 upon selecting an option 782 associated with the text "SMS". As shown, the layout 780 is depicted in the UI 700 by moving below the list of emails 706 in the UI 700.

The user 102a can send a text message (or SMS) for a particular email in the client account. The layout 780 is depicted to include a users and client users list 784 for allowing the user for selecting at least one client user or the other users of the client account from the users and client users list 784. Thereafter, the user may provide inputs or messages of the text messages in a data field 786 (exemplarily depicted as "please respond to my mail—Vincent . . . ) depicted in the layout 780. Additionally, a list of standard (predefined) text messages (see, 788) can be created and updated for the institution 110 for quick application. Thus, the user may select the predefined text messages (see, 788) in the client application 124 or send a new text message in the client application 124 based on the emails by providing inputs in the data field 786. The text message is sent for the email or the client account to the selected users and/or client users upon providing a selection input on a button 790 associated with the text "SEND". The text messages (or SMS) may be sent as a part of notifications as explained with reference to FIG. 2.

In some embodiments, the application server 200 may render an option in the client application 124 for enabling the user (e.g., the user 102a) to include metadata in at least the incoming email and the outgoing email associated with the client account (e.g., the client account 302). The metadata includes chats, discussions, and notes. In addition, the application server 200 may update the metadata associated with the client account 302 based on insights associated with either the incoming or outgoing emails in the client account 302. In particular, the application server 200 processes at least the incoming and outgoing emails in the client account 302 for extracting insights from at least the incoming and outgoing emails of the client account. The insights are extracted from at least the incoming and outgoing emails in the client account based at least on one or more artificial intelligence (AI) models (see, 224 of FIG. 2).

Figure 8:
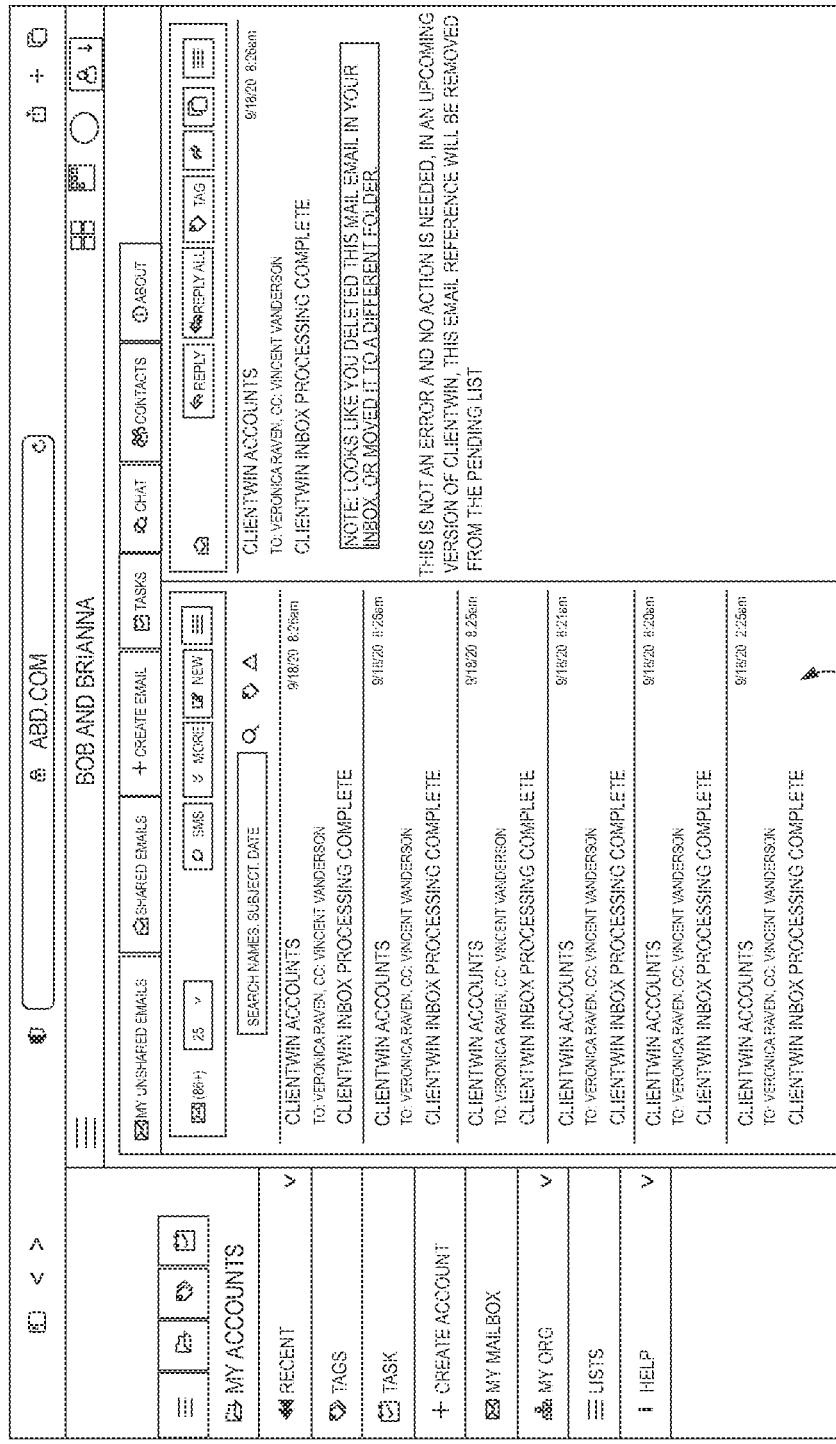
FIG. 8 is an example representation of a UI depicting a mailbox of a user in the client application, in accordance with an embodiment of the present disclosure.

FIG. 8 is an example representation of a UI 800 depicting a mailbox of a user in the client application 124, in accordance with an embodiment of the present disclosure. The UI 800 may be depicted in the client application 124 to a user (e.g., the user 102a) of the client application 124, if the institution 110 has not created any client accounts for the plurality of client users 106a-106n. In this scenario, all new emails will show up in the UI 800. In particular, the UI 800 depicts a mailbox 802. The mailbox 802 is similar to any other email Inbox. The user can only view the emails that are not assigned to any client account or new emails, or other filters to only focus on emails not covered by the client application 124.

Figure 9:
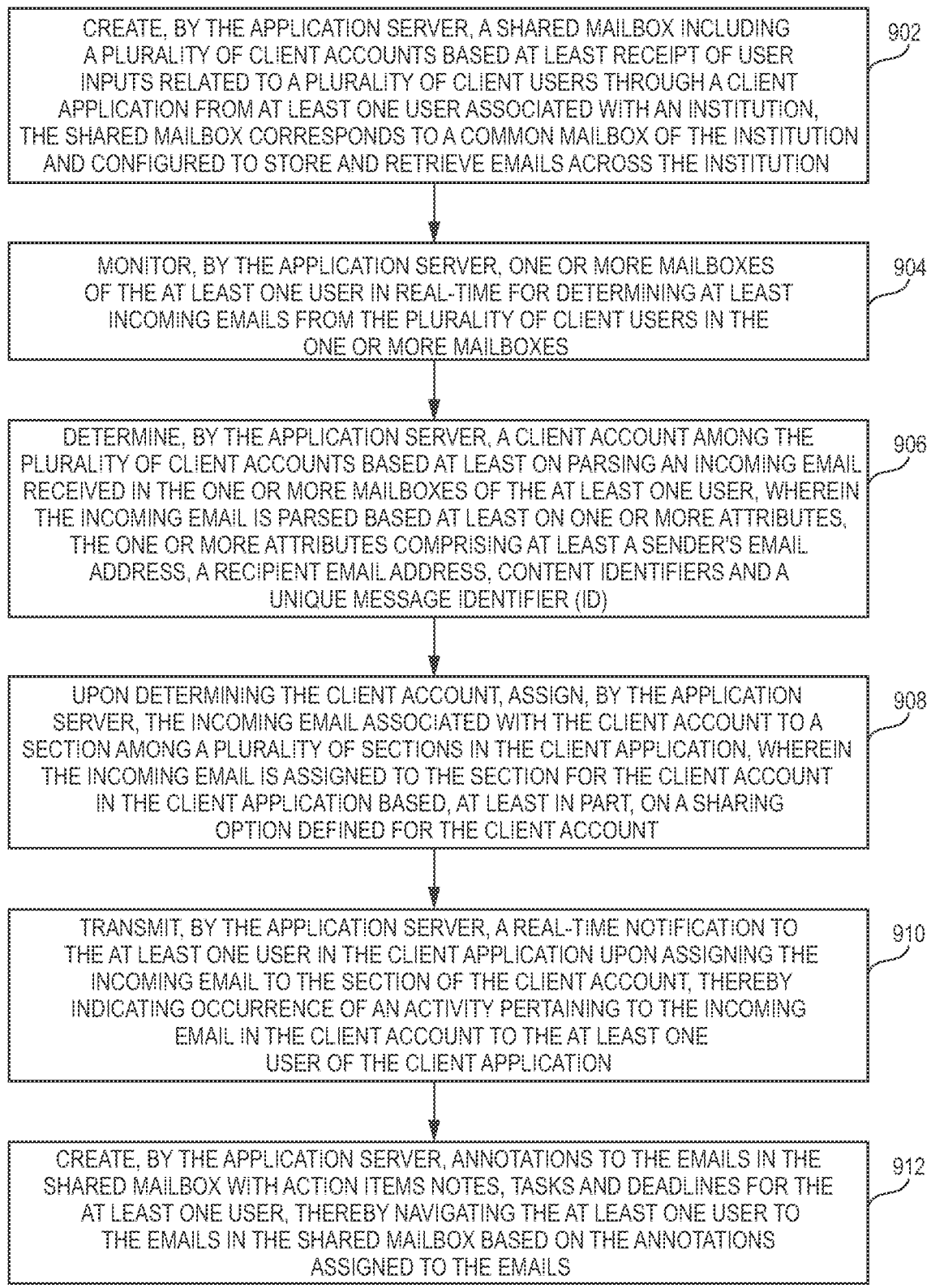
FIG. 9 illustrates a flow diagram of a computer-implemented method for managing and organizing emails in the client application, in accordance with an embodiment of the present disclosure.

FIG. 9 illustrates a flow diagram of a computer-implemented method 900 for managing and organizing emails in the client application 124, in accordance with an embodiment of the present disclosure. The method 900 depicted in the flow diagram may be executed by, for example, the application server 200 or the application server 112. Operations of the flow diagram of the method 900, and combinations of the operations in the flow diagram of the method 900, may be implemented by, for example, hardware, firmware, a processor, circuitry, and/or a different device associated with the execution of software that includes one or more computer program instructions. It is noted that the operations of the method 900 can be described and/or practiced by using a system other than these server systems. The method 900 starts at operation 902.

At operation 902, the method 900 includes creating, by the application server 200, a shared mailbox including a plurality of client accounts based at least receipt of user inputs related to a plurality of client users through a client application from at least one user associated with an institution. The shared mailbox corresponds to a common mailbox of the institution and configured to store and retrieve emails across the institution.

At operation 904, the method 900 includes monitoring, by the application server 200, one or more mailboxes of the at least one user in real-time for determining at least incoming emails from the plurality of client users in the one or more mailboxes.

At operation 906, the method 900 includes determining, by the application server 200, a client account among the plurality of client accounts based at least on parsing an incoming email received in the one or more mailboxes of the at least one user. The incoming email is parsed based at least on one or more attributes. The one or more attributes includes at least a sender's email address, a recipient email address, content identifiers and a unique message identifier (ID).

At operation 908, the method 900 includes upon determining the client account, assigning, by the application server 200, the incoming email associated with the client account to a section among a plurality of sections in the client application. The incoming email is assigned to the section for the client account in the client application based at least on a sharing option defined for the client account.

At operation 910, the method 900 includes transmitting, by the application server 200, a real-time notification to the at least one user in the client application upon assigning the incoming email to the section of the client account, thereby indicating occurrence of an activity pertaining to the incoming email in the client account to the at least one user of the client application.

At operation 912, the method 900 includes creating, by the application server 200, annotations to the emails in the shared mailbox with action items notes, tasks and deadlines for the at least one user, thereby navigating the at least one user to the emails in the shared mailbox based on the annotations assigned to the emails. In particular, annotating such emails by the users to embody tasks, assigned to users of organizations with deadlines. The method includes a virtualization of emails by client accounts, where collections of the emails from the client users become centers of collaboration, through annotating the emails in the corresponding client accounts, chatting about the emails in client accounts and saving notes, attributes in such client accounts, instead of emails being handled in each user's inbox separately as explained above. Further, the operations involved in managing and organizing the emails in the client application 124 across all the users of the institution 110 are already explained above, and therefore they are not reiterated for the sake of brevity.

Figure 10:
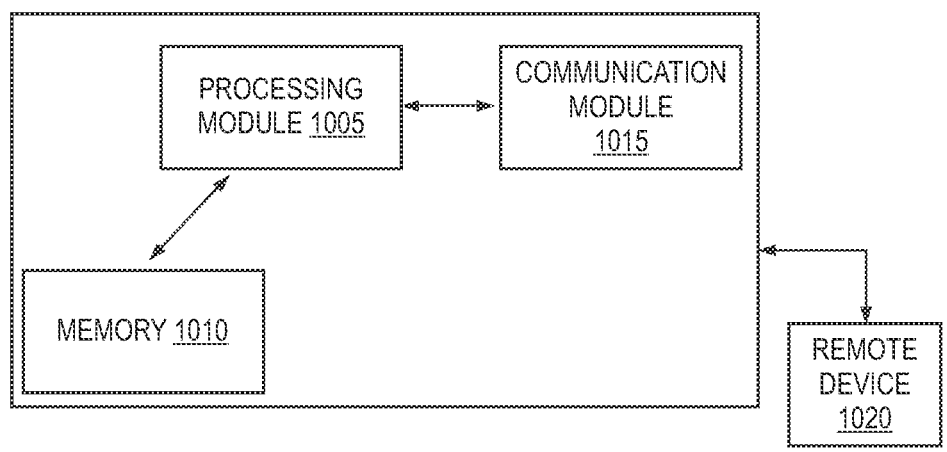
FIG. 10 illustrates a simplified block diagram representation of an email server, in accordance with an embodiment of the present disclosure.

FIG. 10 is a simplified block diagram of an email server 1000, in accordance with an embodiment of the present disclosure. The email server 1000 is an example of the email server 116 of FIG. 1. The email server 1000 may be a separate part, and may operate apart via the network 120 (as shown in FIG. 1). The email server 1000 is configured to manage the one or more mailboxes associated with each of the users 102a-102c of the institution 110.

The email server 1000 includes a processing module 1005 for executing instructions. Instructions may be stored in, for example, but not limited to, a memory 1010. The processing module 1005 may include one or more processing units (e.g., in a multi-core configuration). The processing module 1005 is operatively coupled to a communication module 1015 such that the email server 1000 is capable of communicating with a remote device 1020 such as the application server 200 or any other entity of FIG. 1.

Figure 11:
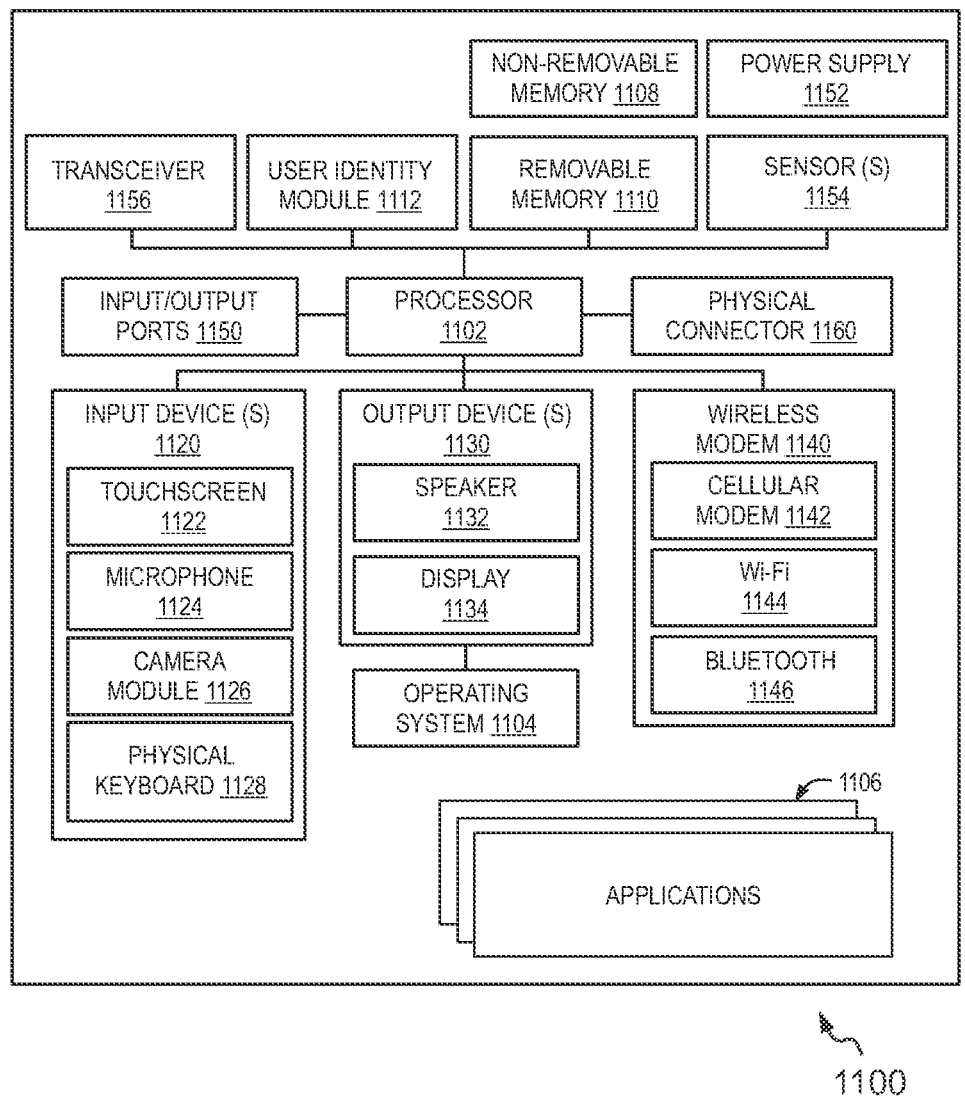
FIG. 11 is a simplified block diagram of an electronic device capable of implementing various embodiments of the present disclosure.

FIG. 11 is a simplified block diagram of an electronic device 1100 capable of implementing various embodiments of the present disclosure. For example, the electronic device 1100 may correspond to the user devices 104a-104d or the computing devices 108a-108n of FIG. 1. The electronic device 1100 is depicted to include one or more applications 1106. For example, the one or more applications 1106 may include the client application 124 of FIG. 1. One of the one or more applications 1106 installed on the electronic device 1100 is capable of communicating with a server (i.e., the application server 200 or the application server 112) for managing and organizing the emails of the users 102a-102c in the institution 110.

It should be understood that the electronic device 1100 as illustrated and hereinafter described is merely illustrative of one type of device and should not be taken to limit the scope of the embodiments. As such, it should be appreciated that at least some of the components described below in connection with the electronic device 1100 may be optional and thus in an embodiment may include more, less or different components than those described in connection with the embodiment of the FIG. 11. As such, among other examples, the electronic device 1100 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the electronic device 1100 and supports for one or more operations of the application (see, the applications 1106) that implements one or more of the innovative features described herein. In addition, the applications 806 may include common mobile computing applications (e.g., telephony applications, email applications, calendars, contact managers, web browsers, messaging applications) or any other computing application.

The illustrated electronic device 1100 includes one or more memory components, for example, a non-removable memory 1108 and/or removable memory 1110. The non-removable memory 1108 and/or the removable memory 1110 may be collectively known as a database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. The electronic device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1100 can support one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to, a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the electronic device 1100 and a public switched telephone network (PSTN).

The electronic device 1100 can further include one or more input/output ports 1150, a power supply 1152, one or more sensors 1154 for example, an accelerometer, a gyroscope, a compass, or an infrared proximity sensor for detecting the orientation or motion of the electronic device 1100 and biometric sensors for scanning biometric identity of an authorized user, a transceiver 156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

The disclosed method with reference to FIG. 9, or one or more operations of the application server 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Advantages

1. Apart from other advantages, the present invention provides a shared view of the emails, and eliminates duplication and manual over-ride of the emails, thus reducing their email overload.
2. Further, the present invention minimizes inbox clutter and increases email processing efficiency.
3. Furthermore, the present invention minimizes new email interruptions by focusing on the client account and associated flags/tags/tasks instead of individual emails. As a result, the time consumed is less due to organizing the emails.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
    creating, by an application server, a shared mailbox comprising a plurality of client accounts based at least receipt of user inputs related to a plurality of client users through a client application from at least one user associated with an institution, the shared mailbox corresponding to a common mailbox of the institution and configured to store and retrieve emails across the institution;
    monitoring, by the application server, one or more mailboxes of the at least one user in real-time for determining at least incoming emails from the plurality of client users in the one or more mailboxes;
    determining, by the application server, a client account among the plurality of client accounts based at least on parsing an incoming email received in the one or more mailboxes of the at least one user, wherein the incoming email is parsed based at least on one or more attributes, the one or more attributes comprising at least a sender's email address, a recipient email address, content identifiers and a unique message identifier (ID);
    upon determining the client account, assigning, by the application server, the incoming email associated with the client account to a section among a plurality of sections in the client application, wherein the incoming email is assigned to the section for the client account in the client application based, at least in part, on a sharing option defined for the client account;

transmitting, by the application server, a real-time notification to the at least one user in the client application upon assigning the incoming email to the section of the client account, thereby indicating occurrence of an activity pertaining to the incoming email in the client account to the at least one user of the client application; and creating, by the application server, annotations to the emails in the shared mailbox with action items notes, tasks and deadlines for the at least one user, thereby navigating the at least one user to the emails in the shared mailbox based on the annotations assigned to the emails.

2. The computer-implemented method as claimed in claim 1, wherein the sharing option comprises at least one of an auto-share option and a manual share option, and the plurality of sections comprises at least a shared email section, and an unshared email section.

3. The computer-implemented method as claimed in claim 2, wherein, the section for the incoming email associated with the client account is determined as the shared email section based at least on user selection of the auto-share option in the client application, and the section for the incoming email associated with the client account is determined as the unshared email section based at least one of a user selection of the manual share option in the client application and determining the incoming email is associated with multiple client accounts among the plurality of client accounts.

4. The computer-implemented method as claimed in claim 3, wherein each of the plurality of client accounts of the institution is sorted based at least on a combination of flags, tasks, bookmarks, category and tags, thereby enabling the at least one user to prioritize the emails assigned to flags, tasks, bookmarks, category and tags.

5. The computer-implemented method as claimed in claim 1, further comprising:

monitoring, by the application server, the client account to determine an activity related to an outgoing email from the client account by the at least one user of the institution, wherein the outgoing email from the client account corresponds to at least one of replying to the incoming email, and sending a new email;

selecting, by the application server, at least one client user of the plurality of client users associated with the client account as default recipients of the client account in response to determining the activity related to sending the email from the client account; and providing, by the application server, access to the email sent to the default recipients from the client account to each user of the at least one user assigned to the client account, wherein the at least one user assigned to the client account performs one or more email operations on the email in the client account, the email being at least one of the incoming email and the outgoing email of the client account.

6. The computer-implemented method as claimed in claim 5, further comprising:

adding, by the application server, an implicit forward message in a reply email to the incoming email, wherein the implicit forward message is included in the reply email based on determining the reply email is initiated by a user among the at least one user who is not copied in the incoming email received in the client account associated with the at least client user.

7. The computer-implemented method as claimed in claim 5, further comprising:

identifying, by the application server, a contact information of one user among the at least one user in the incoming email and the outgoing email of the client account; and assigning, by the application server, the incoming email and the outgoing email to the client account among the plurality of client accounts based at least on identifying the contact information of the one user among the at least one user of the client account, wherein assigning the incoming email and the outgoing email based at least on identifying the contact information of the one user of the client account corresponds to centralizing the incoming email and the outgoing in the client account, and wherein centralizing the incoming and outgoing emails in the client account eliminates duplication by providing access to other users of the at least one user who are not copied in at least one of the incoming email and the outgoing email associated with the client account.

8. The computer-implemented method as claimed in claim 7, wherein the incoming email and the outgoing email associated with each client account of the plurality of client accounts are copied to the shared mailbox and further assigned to their corresponding client account.

9. The computer-implemented method as claimed in claim 8, further comprising facilitating, by the application server, highlighting at least the incoming email and the outgoing email from the plurality of client users that are determined as untagged, thereby enabling the at least one user to manage the incoming and outgoing emails in the client application to at least mark the incoming and outgoing emails as at least tag not required, and add a tag to assign it to a user, thus accounting for all emails in shared mailbox collectively by all users, by their tag status to spur follow up action.

10. The computer-implemented method as claimed in claim 9, wherein assigning the incoming and outgoing emails in the corresponding client account of the plurality of client accounts conforms to serial monotasking, wherein user related tasks are grouped for enabling the at least one user to handle the user related tasks in sequence, and wherein the user related tasks and activities associated with the at least one user are clustered for enabling the at least one user to check at least new emails, tasks, tags, chat messages in the client application.

11. The computer-implemented method as claimed in claim 1, further comprising rendering, by the application server, an option in the client application for enabling the at least one user to include metadata referencing at least the incoming email and the outgoing email associated with the client account, the metadata including chats, discussion and notes.

12. The computer-implemented method as claimed in claim 11, further comprising:

processing, by the application server, at least the incoming and outgoing emails in the client account of the plurality of client accounts for extracting insights from at least the incoming and outgoing emails, chats, tasks, tags and notes of the client account, wherein the insights are extracted from at least the incoming and outgoing emails, chats, tags, tasks and notes in the client account based at least on one or more artificial intelligence (AI) models; and updating, by the application server, metadata associated with the client account based at least on the insights.

13. The computer-implemented method as claimed in claim 1, further comprising providing, by the application server, access to at least a subset of emails and metadata associated with the client account to one or more client users of the client account, thereby allowing the one or more client users to monitor the client account in real-time.

14. The computer-implemented method as claimed in claim 13, further comprising facilitating, by the applications server, populating a set of template emails with information of the one or more client users of the client account in response to outbound emails associated with the client account.

15. The computer-implemented method as claimed in claim 1, further comprising:
monitoring, by the application server, email related actions being performed by the at least one user in the client account for organizing emails associated with the client account, the email related actions comprising at least sharing emails, moving emails, and processing inbound emails; and
in response to determining the email related operations, facilitating, by the application server, background processing of the email related actions.

16. The computer-implemented method as claimed in claim 15, further comprising rendering, by the application server, the email related actions and one or more email operations to the at least one user in the client application for organizing emails in the client account based at least on user selection of one or more usage preferences associated with the client application, the one or more usage preferences comprising at least a read-write option, a read-only option, and a partial-read-only option,
wherein the application server is configured to apply whether one or more mailboxes of the at least one user is not linked with emails from the plurality of clients that are assigned to the shared mailbox and organize the one or more mailboxes of the at least one user corresponding to the shared mailbox of the institution.

17. The computer-implemented method as claimed in claim 1, further comprising:
receiving, by the application server, inputs related to a group of client accounts selected among the plurality of client accounts, and the category and set values associated with one or more properties of each client account of the plurality of client accounts;
creating, by the application server, a bulk email to the group of client accounts by substituting the set values; and
transmitting, by the application server, the bulk email to the group of client accounts, wherein each email of the bulk mail transmitted to the group of client accounts is reflected in corresponding client account of the group of client accounts in the client application.

18. The computer-implemented method as claimed in claim 1, further comprising identifying, by the application server, the incoming email is one of a personal email and a private email received in the one or more mailboxes associated with a user among the at least one user, wherein the incoming email identified as the personal email and the private email is prevented from being copied to the shared mailbox.

19. The computer-implemented method as claimed in claim 1, further comprising:
determining, by the application server, a follow up action associated with a user of the at least one user for at least the incoming email for the client account among the plurality of client accounts, wherein the follow up action is determined based, at least in part, on a centralized email tagging of the incoming email created by another user of the at least one user of the client account for the user of the client account.

20. The computer-implemented method as claimed in claim 1, further comprising rendering, by the application server, a one way access mode for enabling a supervisor of the institution to monitor the plurality of client accounts without intervening the operation of the at least one user while managing their incoming email from the plurality of client users in the client application.

21. An application server, comprising:
a communication interface;
a memory storing executable instructions; and
a processor operatively coupled with the communication interface and the memory, the processor configured to execute the executable instructions to cause the application server to at least:
create a shared mailbox comprising a plurality of client accounts based at least receipt of user inputs related to a plurality of client users through a client application from at least one user associated with an institution, the shared mailbox corresponding to a common mailbox of the institution and configured to store and retrieve emails across the institution,
monitor one or more mailboxes of the at least one user in real-time for determining at least incoming emails from the plurality of client users in the one or more mailboxes,
determine a client account among the plurality of client accounts based at least on parsing an incoming email received in the one or more mailboxes of the at least one user, wherein the incoming email is parsed based at least on one or more attributes, the one or more attributes comprising at least a sender's email address, a recipient email address, content identifiers and a unique message identifier (ID),
upon determining the client account, assign the incoming email associated with the client account to a section among a plurality of sections in the client application, wherein the incoming email is assigned to the section for the client account in the client application based, at least in part, on a sharing option defined for the client account,
transmit a real-time notification to the at least one user in the client application upon assigning the incoming email to the section of the client account, thereby indicating occurrence of an activity pertaining to the incoming email in the client account to the at least one user of the client application; and
create annotations to the emails in the shared mailbox with action items notes, tasks and deadlines for the at least one user, thereby navigating the at least one user to the emails in the shared mailbox based on the annotations assigned to the emails.

22. The application server as claimed in claim 21, wherein the sharing option comprises at least one of an auto-share option and a manual share option, and the plurality of sections comprises at least a shared email section, and an unshared email section.

23. The application server as claimed in claim 22, wherein,
the section for the incoming email associated with the client account is determined as the shared email section based at least on user selection of the auto-share option in the client application, and the section for the incoming email associated with the client account is determined as the unshared email section based at least one of a user selection of the manual share option in the client application and determining the incoming email is associated with multiple client accounts among the plurality of client accounts.

24. The application server as claimed in claim 23, wherein the application server is further configured to sort each of the plurality of client accounts of the institution based at least on a combination of flags, tasks, bookmarks, category and tags, thereby enabling the at least one user to prioritize the emails assigned to flags, tasks, bookmarks, category and tags.

25. The application server as claimed in claim 21, wherein the application server is further configured to:
monitor the client account to determine an activity related to an outgoing email from the client account by the at least one user of the institution, wherein the outgoing email from the client account corresponds to at least one of replying to the incoming email, and sending a new email;
select at least one client user of the plurality of client users associated with the client account as default recipients of the client account in response to determining the activity related to sending the email from the client account; and
provide access to the email sent to the default recipients from the client account to each user of the at least one user assigned to the client account,
wherein the at least one user assigned to the client account performs one or more email operations on the email in the client account, the email being at least one of the incoming email and the outgoing email of the client account.

26. The application server as claimed in claim 25, wherein the application server is further configured to:
add an implicit forward message in a reply email to the incoming email, wherein the implicit forward message is included in the reply email based on determining the reply email is initiated by a user among the at least one user who is not copied in the incoming email received in the client account associated with the at least client user.

27. The application server as claimed in claim 25, wherein the application server is further configured to:
identify a contact information of one user among the at least one user in the incoming email and the outgoing email of the client account; and
assign the incoming email and the outgoing email to the client account among the plurality of client accounts based at least on identifying the contact information of the one user among the at least one user of the client account,
wherein assigning the incoming email and the outgoing email based at least on identifying the contact information of the one user of the client account corresponds to centralizing the incoming email and the outgoing in the client account, and
wherein centralizing the incoming and outgoing emails in the client account eliminates duplication by providing access to other users of the at least one user who are not copied in at least one of the incoming email and the outgoing email associated with the client account.

28. The application server as claimed in claim 27, wherein the incoming email and the outgoing email associated with each client account of the plurality of client accounts are copied to the shared mailbox and further assigned to their corresponding client account.

29. The application server as claimed in claim 28, wherein the application server is further configured to: facilitate highlighting at least the incoming email and the outgoing email from the plurality of client users that are determined as untagged, thereby enabling the at least one user to manage the incoming and outgoing emails in the client application to at least mark the incoming and outgoing emails as at least tag not required, and add a tag to assign it to a user, thus accounting for all emails in shared mailbox collectively by all users, by their tag status to spur follow up action.

30. The application server as claimed in claim 29, wherein assigning the incoming and outgoing emails in the corresponding client account of the plurality of client accounts conforms to serial monotasking, wherein user related tasks are grouped for enabling the at least one user to handle the user related tasks in sequence, and wherein the user related tasks and activities associated with the at least one user are clustered for enabling the at least one user to check at least new emails, tasks, tags, chat messages in the client application.

31. The application server as claimed in claim 21, wherein the application server is further configured to: render an option in the client application for enabling the at least one user to include metadata referencing at least the incoming email and the outgoing email associated with the client account, the metadata including chats, discussion and notes.

32. The application server as claimed in claim 31, wherein the application server is further configured to:
process at least the incoming and outgoing emails in the client account of the plurality of client accounts for extracting insights from at least the incoming and outgoing emails, chats, tags, tasks and notes of the client account, wherein the insights are extracted from at least the incoming and outgoing emails, chats, tags and notes in the client account based at least on one or more artificial intelligence (AI) models; and
update metadata associated with the client account based at least on the insights.

33. The application server as claimed in claim 21, wherein the application server is further configured to: provide access to at least a subset of emails and metadata associated with the client account to one or more client users of the client account, thereby allowing the one or more client users to monitor the client account in real-time.

34. The application server as claimed in claim 33, wherein the application server is further configured to: facilitate populating a set of template emails with information of the one or more client users of the client account in response to outbound emails associated with the client account.

35. The application server as claimed in claim 21, wherein the application server is further configured to:
monitor email related actions being performed by the at least one user in the client account for organizing emails associated with the client account, the email related actions comprising at least sharing emails, moving emails, and processing inbound emails; and
in response to determining the email related operations, facilitate background processing of the email related actions.

36. The application server as claimed in claim 35, wherein the application server is further configured to:
render the email related actions and one or more email operations to the at least one user in the client application for organizing emails in the client account based at least on user selection of one or more usage preferences associated with the client application, the one or more usage preferences comprising at least a read-write option, a read-only option, and a partial-read-only option,
  wherein the application server is configured to implement whether one or more mailboxes of the at least one user is not linked with emails from the plurality of clients that are assigned to the shared mailbox and organize the one or more mailboxes of the at least one user corresponding to the shared mailbox of the institution.

37. The application server as claimed in claim 21, wherein the application server is further configured to:
  receive inputs related to a group of client accounts selected among the plurality of client accounts, and the category and set values associated with one or more properties of each client account of the plurality of client accounts;
  create a bulk email to the group of client accounts by substituting the set values; and
  transmit the bulk email to the group of client accounts, wherein each email of the bulk mail transmitted to the group of client accounts is reflected in corresponding client account of the group of client accounts in the client application.

38. The application server as claimed in claim 21, wherein the application server is further configured to identify the incoming email is one of a personal email and a private email received in the one or more mailboxes associated with a user among the at least one user, wherein the incoming email identified as the personal email and the private email is prevented from being copied to the shared mailbox.

39. The application server as claimed in claim 21, wherein the application server is further configured to:
  determine a follow up action associated with a user of the at least one user for at least the incoming email for the client account among the plurality of client accounts, wherein the follow up action is determined based, at least in part, on a centralized email tagging of the incoming email created by another user of the at least one user of the client account for the user of the client account.

40. The application server as claimed in claim 21, wherein the application server is further configured to render a one way access mode for enabling a supervisor of the institution to monitor the plurality of client accounts without intervening the operation of the at least one user while managing their incoming email from the plurality of client users in the client application.

* * * * *